(12) United States Patent
O'Connor et al.

(10) Patent No.: US 12,490,678 B2
(45) Date of Patent: Dec. 9, 2025

(54) VEHICLE LOCATION WITH DYNAMIC MODEL AND UNLOADING CONTROL SYSTEM

(71) Applicant: Deere & Company, Moline, IL (US)

(72) Inventors: Sara C. O'Connor, Clive, IA (US);
Kellen E. O'Connor, Clive, IA (US);
Jeremy J. Faust, Grimes, IA (US);
Ryan R. White, Polk City, IA (US);
Nicholas C. Baltz, Port Byron, IL (US)

(73) Assignee: DEERE & COMPANY, Moline, IL (US)

( * ) Notice: Subject to any disclaimer, the term of this patent is extended or adjusted under 35 U.S.C. 154(b) by 267 days.

(21) Appl. No.: 18/334,863

(22) Filed: Jun. 14, 2023

(65) Prior Publication Data

US 2024/0138313 A1    May 2, 2024

Related U.S. Application Data

(60) Provisional application No. 63/381,178, filed on Oct. 27, 2022, provisional application No. 63/381,187, filed on Oct. 27, 2022.

(51) Int. Cl.
*A01D 90/10* (2006.01)
*A01D 41/127* (2006.01)

(52) U.S. Cl.
CPC ......... *A01D 90/105* (2013.01); *A01D 41/127* (2013.01)

(58) Field of Classification Search
CPC .... A01D 90/105; A01D 41/127; A01D 43/07; A01D 43/08; A01D 41/1217

USPC ........................................................... 701/50
See application file for complete search history.

(56) References Cited

U.S. PATENT DOCUMENTS

| | | |
|---|---|---|
| 5,575,316 A | 11/1996 | Pollklas |
| 7,277,784 B2 | 10/2007 | Weiss |
| 8,060,283 B2 | 11/2011 | Mott et al. |
| 8,868,304 B2 | 10/2014 | Bonefas |
| 9,119,342 B2 | 9/2015 | Bonefas |
| 9,326,444 B2 | 5/2016 | Bonefas |
| 9,642,305 B2 | 5/2017 | Nykamp et al. |
| 9,861,040 B2 | 1/2018 | Bonefas |

(Continued)

FOREIGN PATENT DOCUMENTS

| | | |
|---|---|---|
| CN | 108550141 A | 9/2018 |
| DE | 102009027245 A1 | 12/2010 |

(Continued)

OTHER PUBLICATIONS

U.S. Appl. No. 18/465,580 Application and Drawings, filed Sep. 12, 2023. 114 pages.

(Continued)

*Primary Examiner* — Ramya P Burgess
*Assistant Examiner* — Preston Jay Miller
(74) *Attorney, Agent, or Firm* — Christopher J. Volkmann; KELLY, HOLT & CHRISTENSON PLLC

(57) ABSTRACT

A hitch point where a receiving vehicle is coupled to a following vehicle is located relative to a leading vehicle. The trajectory or route of the following vehicle is detected and a dynamic model estimates a location of a receiving area in the receiving vehicle relative to the leading vehicle based on the trajectory or route of the following vehicle and the location of the hitch point relative to the leading vehicle.

19 Claims, 24 Drawing Sheets

(56) References Cited

U.S. PATENT DOCUMENTS

| | | | |
|---|---|---|---|
| 9,992,931 | B2 | 6/2018 | Bonefas et al. |
| 2008/0147282 | A1* | 6/2008 | Kormann ............ A01B 69/003 701/50 |
| 2012/0215381 | A1 | 8/2012 | Wang et al. |
| 2012/0215394 | A1 | 8/2012 | Wang et al. |
| 2012/0215409 | A1* | 8/2012 | Wang ................ A01D 43/085 701/50 |
| 2013/0166157 | A1 | 6/2013 | Schleicher et al. |
| 2013/0213518 | A1 | 8/2013 | Bonefas |
| 2013/0231823 | A1* | 9/2013 | Wang ................ A01D 43/086 701/32.4 |
| 2014/0224377 | A1* | 8/2014 | Bonefas ............. G05D 1/0251 141/94 |
| 2014/0325422 | A1 | 10/2014 | Madsen et al. |
| 2015/0264866 | A1 | 9/2015 | Foster et al. |
| 2015/0366134 | A1 | 12/2015 | Dollinger et al. |
| 2016/0057921 | A1* | 3/2016 | Pickett ............... A01B 69/008 701/41 |
| 2017/0042088 | A1 | 2/2017 | Nykamp et al. |
| 2017/0055446 | A1 | 3/2017 | Nykamp et al. |
| 2018/0024549 | A1 | 1/2018 | Hurd |
| 2018/0058861 | A1 | 3/2018 | Doria et al. |
| 2020/0039306 | A1 | 2/2020 | Rogan |
| 2020/0128738 | A1 | 4/2020 | Suleman et al. |
| 2020/0132822 | A1 | 4/2020 | Pimentel et al. |
| 2020/0133262 | A1* | 4/2020 | Suleman ............ G05D 1/0278 |
| 2020/0164803 | A1* | 5/2020 | Jales Costa ........ B62D 15/0285 |
| 2020/0196526 | A1 | 6/2020 | Koch et al. |
| 2020/0319655 | A1 | 10/2020 | Desai et al. |
| 2021/0195840 | A1* | 7/2021 | Puryk ................. A01D 90/10 |
| 2021/0294337 | A1 | 9/2021 | Van Mill et al. |
| 2021/0329840 | A1 | 10/2021 | Craig |
| 2021/0337729 | A1 | 11/2021 | O'Connor et al. |
| 2022/0015288 | A1 | 1/2022 | Christiansen et al. |
| 2022/0015290 | A1* | 1/2022 | Yao ................... A01D 41/127 |
| 2022/0122197 | A1 | 4/2022 | Hanrieder |
| 2022/0197302 | A1 | 6/2022 | McClelland et al. |
| 2022/0204051 | A1 | 6/2022 | Rands et al. |
| 2022/0287239 | A1 | 9/2022 | Faust et al. |
| 2022/0410704 | A1 | 12/2022 | O'Connor et al. |
| 2023/0113645 | A1 | 4/2023 | Bilde et al. |
| 2023/0180659 | A1 | 6/2023 | Grieshop et al. |
| 2023/0281896 | A1 | 9/2023 | Christiansen et al. |
| 2023/0345856 | A1 | 11/2023 | Mahler et al. |
| 2023/0403969 | A1 | 12/2023 | Christiansen et al. |

FOREIGN PATENT DOCUMENTS

| | | |
|---|---|---|
| DE | 102012211001 A1 | 1/2014 |
| DE | 102015109799 A1 | 12/2016 |
| DE | 102016214320 A1 | 2/2017 |
| EP | 1219153 A2 | 7/2002 |
| EP | 2044826 A2 | 4/2009 |
| EP | 2245917 A2 | 11/2010 |
| EP | 2995191 A1 | 3/2016 |
| EP | 3316218 A1 | 5/2018 |
| EP | 3815486 A1 | 5/2021 |
| EP | 3949714 A1 | 2/2022 |
| EP | 3955183 A1 | 2/2022 |
| EP | 4056019 A1 | 9/2022 |
| EP | 4062740 A1 | 9/2022 |
| EP | 4070636 A1 | 10/2022 |
| EP | 4101286 A1 | 12/2022 |
| WO | WO 2022036114 A1 | 2/2022 |

OTHER PUBLICATIONS

U.S. Appl. No. 18/352,576 Application and Drawings, filed Jul. 14, 2023, 39 pages.

U.S. Appl. No. 18/358,401 Application and Drawings, filed Jul. 25, 2023, 47 pages.

U.S. Appl. No. 18/471,701 Application and Drawings, filed Sep. 21, 2023, 50 pages.

Autodesk, "Determine vol. of Solid", Oct. 16, 2019, 3 pages. <https://knowledge.autodesk.com/support/autocad/learn-explore/caas/sfdcarticles/sfdcarticles/Determine-volume-of-solid.html#:~:text=To%20determine%20the%20volume%20of%20a%20solid%20object%2C%20use%20the,Press%20ENTER>.

Stanley, Nick, Solidworks Calculating Volume of a Solid. GoEngineer, 6 pages. Feb. 3, 2022. Retrieved from the Internet: <https://www.goengineer.com/blog/solidworks-calculating-volume-of-a-solid>.

U.S. Appl. No. 63/381,178 Application and Drawings, filed Oct. 27, 2022, 101 pages.

U.S. Appl. No. 63/381,187 Application and Drawings, filed Oct. 27, 2022, 104 pages.

U.S. Appl. No. 63/512,368 Application and Drawings, filed Jul. 7, 2023, 101 pages.

Tesla Motors Club Community Thread entitled "Lane change notification" 4 pages, originally posted Dec. 29, 2021 by user "Horvin". Retrieved from internet: <https://teslamotorsclub.com/tmc/threads/lane-change-notification.252072/>.

U.S. Appl. No. 18/447,718 Application and Drawings, filed Aug. 10, 2023, 53 pages.

U.S. Appl. No. 18/334,886 Application and Drawings, filed Jun. 14, 2023, 47 pages.

U.S. Appl. No. 18/334,874 Application and Drawings, filed Jun. 14, 2023, 59 pages.

U.S. Appl. No. 18/334,869 Application and Drawings, filed Jun. 14, 2023, 85 pages.

U.S. Appl. No. 18/334,861 Application and Drawings, filed Jun. 14, 2023, 96 pages.

Huang, Xiaoshui & Mei, Guofeng & Zhang, Jian & Abbas, Rena. (2021). A comprehensive survey on point cloud registration, Mar. 5, 2021, 17 pages. https://www.researchgate.net/publication/349787695_A_comprehensive_survey_on_point_cloud_registration.

Active Fill Control (https://www.deere.com/en/technology-products/precision-ag-technology/guidance/active-fill-control/) 2 pages, Retrieved on Jun. 27, 2023.

Machine Sync (https://www.deere.com/en/technology-products/precision-ag-technology/guidance/machine-sync/) 3 pages, Retrieved on Jun. 27, 2023.

Extended European Search Report and Written Opinion issued in European Patent Application No. 23202822.5, dated Mar. 19, 2024, in 07 pages.

Extended European Search Report and Written Opinion issued in European Patent Application No. 23203069.2, dated Mar. 18, 2024, in 07 pages.

Extended European Search Report and Written Opinion issued in European Patent Application No. 23203519.6, dated Mar. 14, 2024, in 05 pages.

Extended European Search Report and Written Opinion issued in European Patent Application No. 23203536.0, dated Mar. 14, 2024, in 06 pages.

Extended European Search Report and Written Opinion issued in European Patent Application No. 23203537.8, dated Mar. 14, 2024, in 05 pages.

Extended European Search Report and Written Opinion issued in European Patent Application No. 23202466.1, dated Mar. 26, 2024, in 07 pages.

Extended European Search Report and Written Opinion issued in European Patent Application No. 23202485.1, dated Mar. 26, 2024, in 07 pages.

Extended European Search Report and Written Opinion issued in European Patent Application No. 23203067.6, dated Mar. 26, 2024, in 11 pages.

Extended European Search Report and Written Opinion issued in European Patent Application No. 23202510.6, dated Apr. 4, 2024, in 08 pages.

Extended European Search Report and Written Opinion issued in European Patent Application No. 23202817.5, dated Apr. 23, 2024, in 08 pages.

* cited by examiner

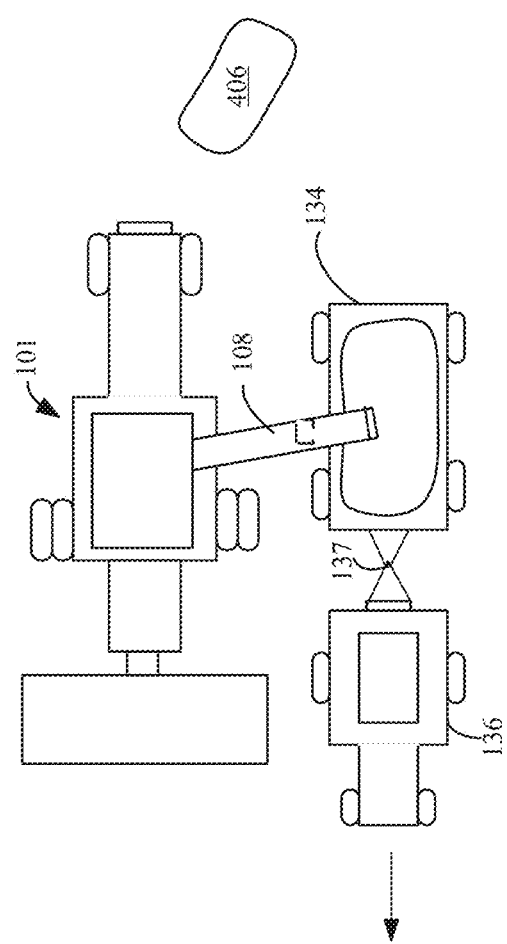

VEHICLE LOCATION WITH DYNAMIC MODEL AND UNLOADING CONTROL SYSTEM

CROSS-REFERENCE TO RELATED APPLICATION

The present application is based on and claims the benefit of U.S. provisional patent application Ser. No. 63/381,178, filed Oct. 27, 2022, and U.S. provisional patent application Ser. No. 63/381,187, filed Oct. 27, 2022, the content of which is hereby incorporated by reference in its entirety.

FIELD OF THE DESCRIPTION

The present description generally relates to machines that load material into receiving vehicles, such as harvesting machines that fill carts, semitrailers, or other agricultural receiving vehicles. More specifically, but not by limitation, the present description relates to automated control of an unloading operation with automatic receiving vehicle parameter location.

BACKGROUND

There are a wide variety of different types of vehicles that load material into other vehicles. Some such vehicles include agricultural vehicles such as forage harvesters or other harvesters (such as combine harvesters, sugarcane harvesters, silage harvesters, etc.), that harvest grain or other crop. Such harvesters often unload material into carts, which may be pulled by tractors, or semitrailers, as the harvesters are moving. Other vehicles that unload into receiving vehicles include construction vehicles, such as cold planers that unload into a dump truck, and other vehicles.

Taking an agricultural harvester as an example, while harvesting in a field using a forage harvester or combine harvester, an operator attempts to control the harvester to maintain harvesting efficiency, during many different types of conditions. The soil conditions, crop conditions, etc. can all change. This may result in the operator changing control settings. This means the operator needs to devote a relatively large amount of attention to controlling the forage harvester or combine harvester.

At the same time, a semitruck or tractor-pulled cart (a receiving vehicle), is often in position relative to the harvester (e.g., alongside the harvester or behind the harvester) so that the harvester can fill the truck or cart, while moving through the field. In some current systems, this requires the operator of the harvester to control the position of the unloading spout and flap so that the truck or cart is filled evenly, but not over filled. Even a momentary misalignment between the spout and the truck or cart may result in hundreds of pounds of harvested material being dumped on the ground, rather than in the truck or cart.

The discussion above is merely provided for general background information and is not intended to be used as an aid in determining the scope of the claimed subject matter.

SUMMARY

A hitch point where a receiving vehicle is coupled to a following vehicle is located relative to a leading vehicle. The trajectory or route of the following vehicle is detected and a dynamic model estimates a location of a receiving area in the receiving vehicle relative to the leading vehicle based on the trajectory or route of the following vehicle and the location of the hitch point relative to the leading vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 13A, 13B, 13C, 13D, and 13E show examples of how the position of a receiving vehicle changes.

DETAILED DESCRIPTION

Figure 1:
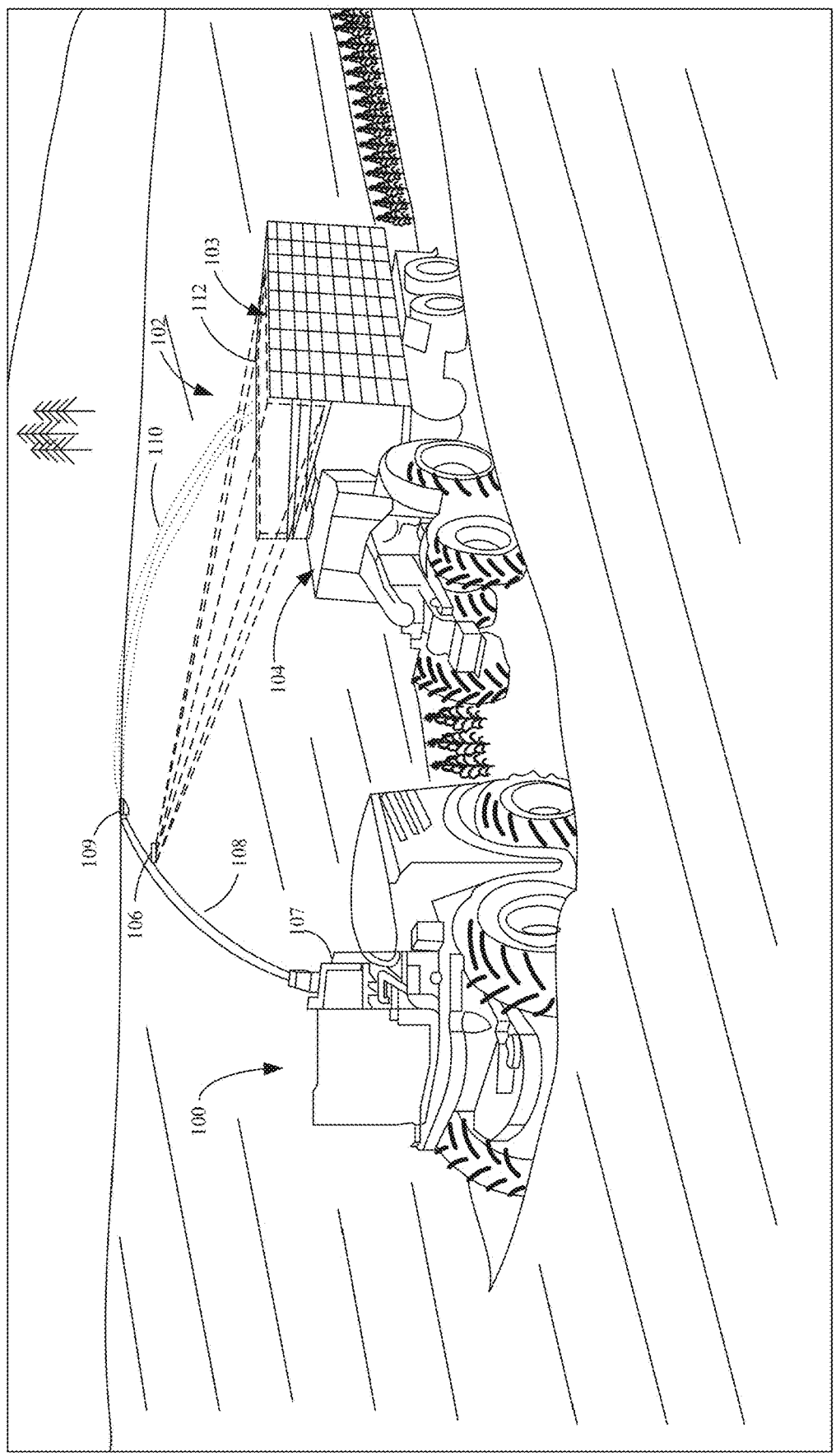
FIG. 1 is a pictorial illustration of one example of a forage harvester filling a tractor-pulled receiving vehicle, with the receiving vehicle following the forage harvester.

The present discussion proceeds with respect to an agricultural harvester, but it will be appreciated that the present discussion is also applicable to construction machines or other material loading vehicles as well. As discussed above, it can be very difficult for an operator to maintain high efficiency in controlling a harvester, and also to optimally monitor the position of the receiving vehicle during an unloading (or filling) operation. This difficulty can even be exacerbated when the receiving vehicle is located behind the harvester (such as a forage harvester), so that the forage harvester is executing a rear unloading operation, but the difficulty also exists in side-by-side unloading scenarios.

In order to address these issues, some automatic cart filling control systems have been developed to automate portions of the filling process. One such automatic fill control system uses a stereo camera on the spout of the harvester to capture an image of the receiving vehicle. An image processing system determines dimensions of the receiving vehicle and the distribution of crop deposited inside the receiving vehicle. The system also detects crop height within the receiving vehicle, in order to automatically aim the spout toward empty spots and control the flap position (and thus material trajectory) to achieve a more even fill, while reducing spillage. Such systems can fill the receiving vehicle according to a fill strategy (such as front-to-back, back-to-front, etc.) that is set by the operator or that is set in other ways.

In addition, some current harvesters are provided with a machine synchronization control system. The harvester may be a combine harvester so that the spout is not movable relative to the frame during normal unloading operations. Instead, the relative position of the receiving vehicle and the combine harvester is changed in order to fill the receiving vehicle as desired. Thus, in a front-to-back fill strategy, for instance, the relative position of the receiving vehicle, relative to the combine harvester, is changed so that the spout is first filling the receiving vehicle at the front end, and then gradually fills the receiving vehicle moving rearward. In such an example, the combine harvester and receiving vehicle may have machine synchronization systems which communicate with one another. When the relative position of the two vehicles is to change, the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vehicle that is currently being filled is approaching its desired fill level. In that case, the machine synchronization system on the combine harvester can send a "nudge" signal to the machine synchronization system on the towing vehicle. The "nudge", once received by the machine synchronization system on the towing vehicle, causes the towing vehicle to momentarily speed up or slow down, thus nudging the position of the receiving vehicle forward or rearward, respectively, relative to the combine harvester.

In all of the systems that attempt to automate part or all of the unloading process from a harvester into a receiving vehicle, the automated system attempts to understand where the receiving vehicle is located over time relative to the towing vehicle (e.g., the tractor pulling the receiving vehicle—also referred to has the following vehicle), and relative to the leading vehicle (e.g., the harvester or the vehicle that is controlling the following vehicle). For purposes of the present discussion, the term leading vehicle will be the vehicle that is unloading material into the receiving vehicle. The term following vehicle will refer to the propulsion vehicle, or towing vehicle (such as a tractor), that is providing propulsion to the receiving vehicle (such as a cart).

Determining the location of the receiving vehicle over time can be accomplished using different types of systems. In some current systems, a camera and image processor are used to capture an image (static or video) of parts of the receiving vehicle (the edges of the receiving area of the cart, the walls of the cart, the front end and rear end of the cart, etc., collectively referred to herein as receiving vehicle parameters) and an image processor processes that image in attempt to identify the receiving vehicle parameters, in real-time, during the harvesting operation. The image processor identifies the receiving vehicle parameters in the image and a controller then attempts to identify the location of the receiving vehicle parameters relative to the leading vehicle (e.g., relative to the harvester), in real-time, during harvesting and unloading.

However, this can be prone to errors. For instance, during the harvesting and unloading operation, the environment can be relatively dusty or have other obscurants so that it can be difficult to continuously identify the receiving vehicle parameters and then calculate their location relative to the leading vehicle. The dust or other obscurants in the environment can lead to an image that is difficult to process, and therefore, the accuracy in identifying the receiving vehicle parameters (and thus locating them relative to the leading vehicle) can take additional time, and can be error prone.

The present description thus proceeds, in one example, with respect to a system that conducts a calibration operation that identifies one or more receiving vehicle parameters and the position of the parameter(s) relative to a reference point on the following vehicle. A detector on the leading vehicle detects the receiving vehicle parameters. Positioning systems (e.g., global navigation satellite systems—GNSS receivers) on the leading vehicle and the following vehicle communicate with one another so that the relative position of the leading vehicle, relative to the following vehicle, is known. An offset on the following vehicle between the positioning system and a reference point (such as a hitch, wheelbase, etc.) is also known. A calibration system thus determines the relative position of the receiving vehicle parameters, relative to the location of the leading vehicle (as identified by the positioning system on the leading vehicle) and transposes that information into a location of the receiving vehicle parameters relative to the reference point on the following vehicle. This is referred to as the calibrated offset value corresponding to the receiving vehicle parameter. Then, during an unloading operation, the leading vehicle (e.g., the harvester) need only receive the position of the following vehicle (e.g., the GPS coordinates of the tractor). The leading vehicle can then calculate where the receiving vehicle parameter (e.g., the front wall, the side walls, the rear wall, etc. of the receiving vehicle) is located relative to the reference location on the trailing vehicle (e.g., the trailer hitch of the tractor) based upon the calibrated offset value for the particular receiving vehicle parameter under consideration.

In another example, the location of the hitch point (or pivot point) where the receiving vehicle is coupled to the following vehicle is identified relative to the leading vehicle. The position and heading or route of the following vehicle is detected relative to the leading vehicle. A dynamic model identifies the location of the receiving vehicle relative to the leading vehicle based on the location of the hitch relative to the leading vehicle and based on the position and heading or route of the following vehicle relative to the loading vehicle.

In this way, the leading vehicle need not rely on real-time images captured in a noisy (e.g., dusty) environment to attempt to identify the location of the receiving vehicle during the unloading process. Instead, during harvesting and unloading, once the GNSS location of the hitch point on the following vehicle is known (or the relative position of the hitch point on the following vehicle is known relative to the leading vehicle), along with the route or heading of the following vehicle relative to the leading vehicle, then the location of the receiving vehicle can be identified using the dynamic model, without performing image processing. The unloading operation can thus be controlled based on the output from the dynamic model.

FIG. 1 is a pictorial illustration showing one example of a self-propelled forage harvester 100 (a material loading vehicle also referred to as a leading vehicle) filling a tractor-pulled grain cart (or receiving vehicle) 102. Cart 102 (also referred to as receiving vehicle 102) thus defines an interior that forms a receiving vessel 103 for receiving harvested material through a receiving area 112. In the example shown in FIG. 1, a tractor 104 (a towing vehicle also referred to as a following vehicle), that is pulling grain cart 102, is positioned directly behind forage harvester 100 Also, in the example illustrated in FIG. 1, forage harvester 100 has a detector such as camera 106 mounted on the spout 108 through which the harvested material 110 is traveling. The spout 108 can be pivotally or rotatably mounted to a frame 107 of harvester 100. In the example shown in FIG. 1, the detector 106 is a stereo-camera or a mono-camera that captures an image (e.g., a still image or video) of the receiving area 112 of cart 102. Also, in the example shown in FIG. 1, the receiving area 112 is defined by an upper edge of the walls of cart 102.

When harvester 100 has an automatic fill control system that includes image processing, as discussed above, the automatic fill control system attempts to identify the location of the receiving area 112 by identifying the edges or walls of the receiving area and can then gauge the height of harvested material in cart 102, and the location of that material in the receiving vehicle. The system thus automatically controls the position of spout 108 and flap 109 to direct the trajectory of material 110 into the receiving area 112 of cart 102 to obtain an even fill throughout the entire length and width of cart 102, while not overfilling cart 102. By automatically, it is meant, for example, that the operation is performed without further human involvement except, perhaps, to initiate or authorize the operation.

For example, when executing a back-to-front automatic fill strategy the automatic fill control system may attempt to move the spout and flap so the material begins landing at a first landing point in the back of vessel 103 of receiving vehicle 102. Then, once a desired fill level is reached in the back of vessel 103, the automatic fill control system moves the spout and flap so the material begins landing just forward of the first landing point in vessel 103.

There can be problems with this approach. The environment of receiving area 112 can have dust or other obscurants making it difficult to visually identify the location and bounds of receiving area 112. Thus, it can be difficult to accurately control the trajectory of material 110 to achieve the desired fill strategy.

Figure 2:
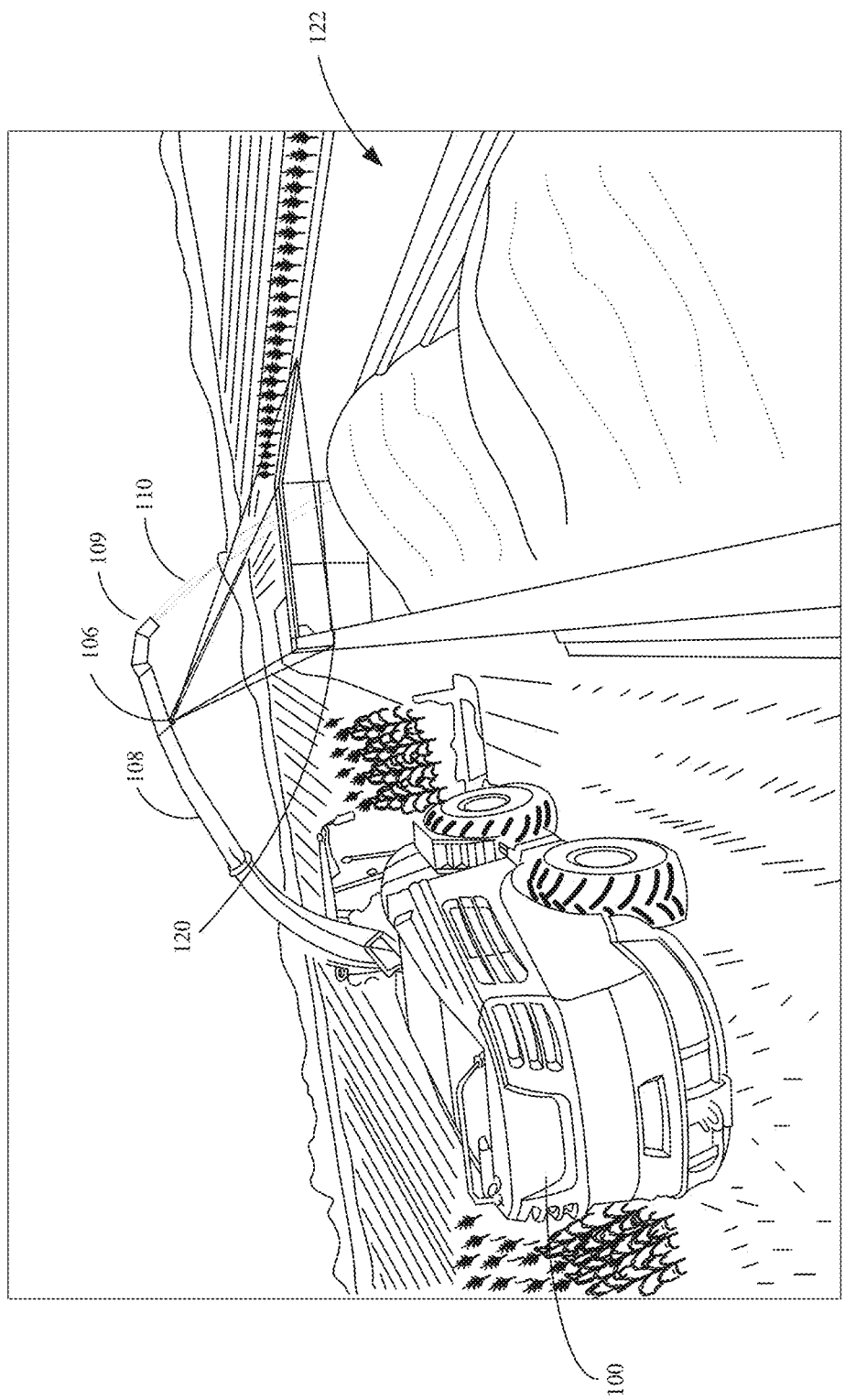
FIG. 2 is a pictorial illustration of one example of a forage harvester filling a receiving vehicle that is alongside the forage harvester.

FIG. 2 is a pictorial illustration showing another example of a self-propelled forage harvester 100, this time loading a semi-trailer (or receiving vessel on a receiving vehicle) 122 in a configuration in which a semi-tractor (also referred to as a following vehicle) is pulling semi-trailer 122 (also referred to as receiving vehicle 122) alongside forage harvester 100. Therefore, the spout 108 and flap 109 are positioned to unload the harvested material 110 to fill trailer 122 according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify a landing point for the harvested material in trailer 122.

Figure 3:
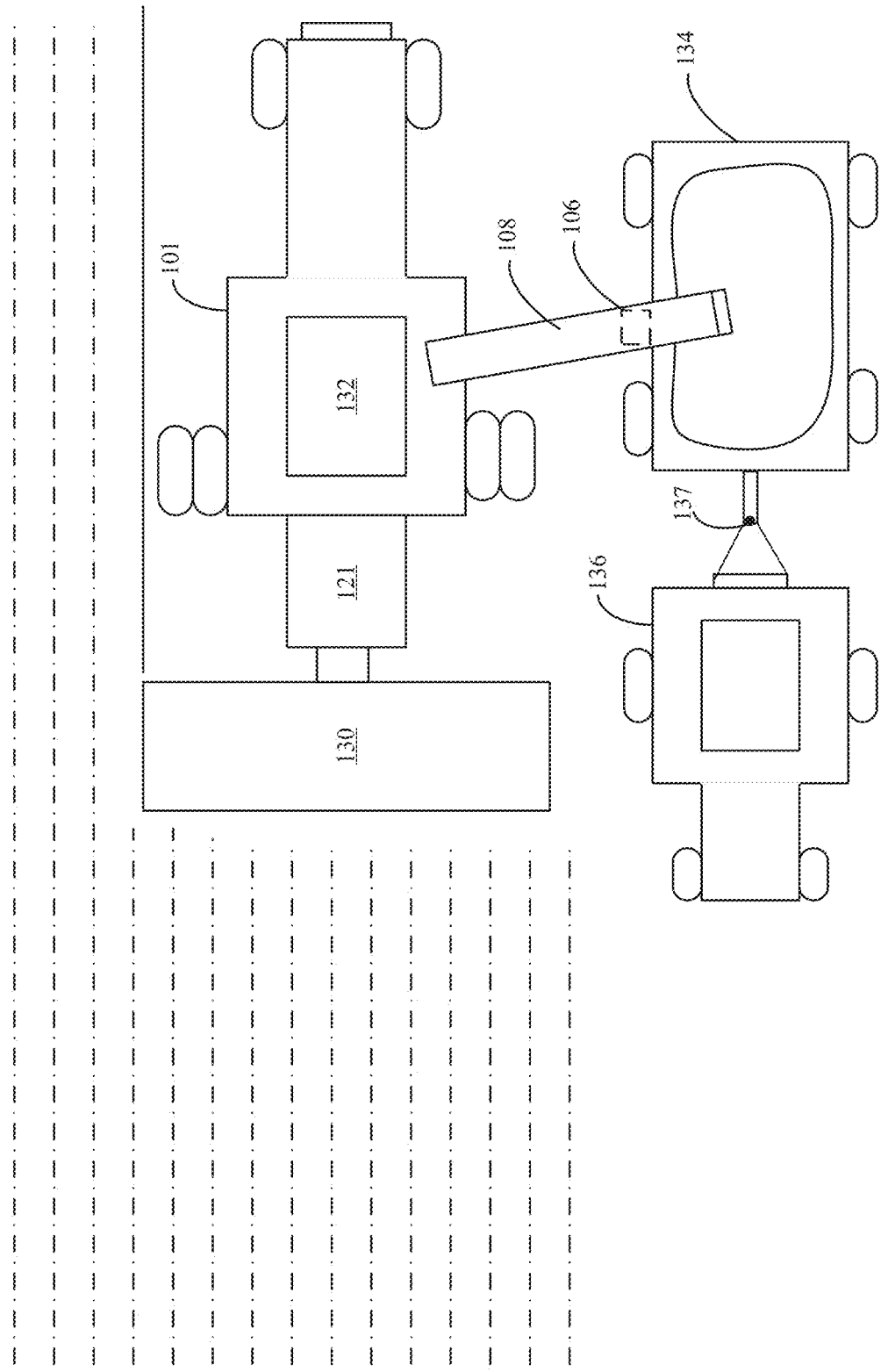
FIG. 3 shows a combine harvester filling a receiving vehicle.

FIG. 3 shows an example in which leading vehicle 101 is a combine harvester, with an operators compartment 121 and with a header 130 that engages crop. The crop is processed and placed in a clean grain tank 132, where it is unloaded (such as using an auger) through spout 108 into a receiving vehicle 134 (e.g., a grain cart) that is pulled by a following vehicle 136 (e.g., a tractor). FIG. 3 shows that receiving vehicle 134 is coupled to following vehicle 136 at a hitch point, or pivot point, 137. When harvester 101 is a combine harvester, it may be that the spout 108 is not moved relative to the frame of harvester 101 during normal unloading operations. Instead, the relative position of the receiving vehicle 134 and the combine harvester 101 is changed in order to fill the receiving vessel as desired. Thus, if a front-to-back fill strategy is to be employed, then the relative position of the receiving vessel in receiving vehicle 134, relative to the combine harvester 101, is changed so that the spout 108 is first filling the receiving vehicle 134 at the front end, and then gradually fills the receiving vessel moving rearward.

In the configuration shown in FIGS. 2 and 3, spout 108 illustratively has a detector, such as a stereo camera, that again attempts to identify parameters of the receiving vehicle so that the receiving vehicle can be located and so that the unloading operation can be controlled to unload material at a desired location in the receiving vehicle to accomplish a desired fill strategy. Again, as with the configuration illustrated in FIG. 1, the environment of the receiving vehicles 122 and 134 in FIGS. 2 and 3, respectively, may have dust or other obscurants making it difficult to identify the parameters of the receiving vehicle (e.g., the edges or walls that define the receiving vessel) during runtime.

Thus, the present description proceeds with respect to a system that conducts a calibration operation for the following vehicle and receiving vehicle to identify an offset between one of the receiving vehicle parameters (e.g., the front wall, either or both sidewalls, the rear wall, etc.) and a known reference location on the following vehicle on the following vehicle (such as the tractor hitch, point 137 the wheelbase, etc.). The offset is referred to has the calibrated offset value. The calibrated offset value can then be used during the harvesting operation to locate the receiving vehicle relative to the following vehicle without the need to identify the receiving vehicle parameters in an image that may be captured in a noisy environment (such as a dusty environment or an environment that has other obscurants) during the harvesting and unloading operation. Instead, the control system simply needs to obtain the location of the following vehicle (such as through a GNSS receiver or another location detection system) and then use that location to calculate the location of the receiving vehicle using the calibrated offset value.

For instance, by tracking the position of hitch point 137 and the route of following vehicle 136 relative to leading vehicle 101, a dynamic model can be used to identify the location of receiving vehicle 134 relative to leading vehicle 101. This location can be used to control the unloading operation (e.g., control the trajectory of material being unloaded, control the position of the vehicles, controlling the unloading subsystem, etc.).

Figure 4:
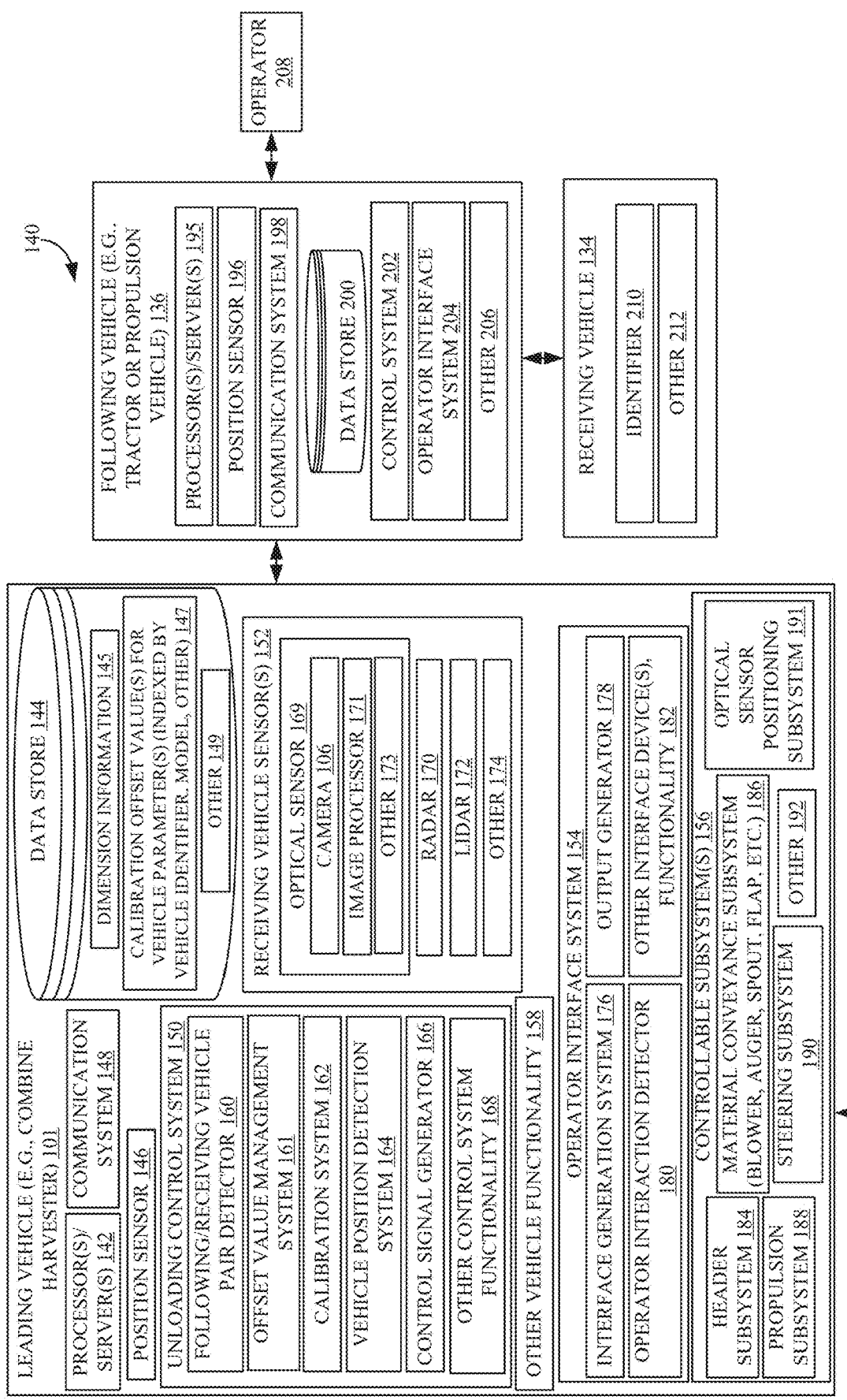
FIG. 4 is a block diagram of one example of an agricultural system.

FIG. 4 is a block diagram showing one example of an agricultural system 140 which includes leading vehicle (in the present example, a combine harvester) 101 which is followed by following vehicle (in the present example, a tractor or another propulsion vehicle) 136. Following vehicle 136 is pulling a receiving vehicle 134. It will be appreciated that while agricultural system 140 shown in FIG. 4 includes leading vehicle 101, following vehicle 136, and receiving vehicle 134 (e.g., the vehicles shown in the example illustrated in FIG. 3) other leading vehicles, following vehicles, and receiving vehicles can be used as well. The example shown in FIG. 4 is shown for the sake of example only.

Leading vehicle 101 includes one or more processors or servers 142, data store 144 (which can include machine dimension information 145, vehicle parameter offset values—e.g., calibrated offset value(s) for vehicle parameter(s), 147 which may be indexed by vehicle identification number—VIN or vehicle model number or other vehicle identifier, and other information 149), position sensor 146, communication system 148, unloading control system 150, receiving vehicle sensors 152, operator interface system 154, controllable subsystems 156, and other vehicle functionality 158. Unloading control system 150 can include following/receiving vehicle pair detector 160, offset value management system 161, calibration system 162, vehicle position detection system 164, control signal generator 166, and other control system functionality 168. Receiving vehicle sensors 152 can include optical sensor 169, RADAR sensor 170, LIDAR sensor 172, and/or other sensors 174. Optical sensor 169 can include camera 106, image processor 171, and/or other items 173. Operator interface system 154 can include interface generation system 176, output generator 178, operator interaction detector 180, and other interface devices and/or functionality 182. Controllable subsystems 156 can include header subsystem 184, material conveyance subsystem (e.g., blower, spout, flap, etc.) 186, propulsion subsystem 188, steering subsystem 190, optical sensor positioning system 191, and other items 192. FIG. 4 also shows that leading vehicle 101 can be operated by an operator 194.

Following vehicle 136 can include position sensor 196, communication system 198, one or more processors or servers 195, data store 200, control system 202, operator interface system 204, and any of a wide variety other functionality 206. FIG. 4 also shows that following vehicle 136 is operated by operator 208. Receiving vehicle 134 can include an identifier 210 and/or other items 212. Before describing the overall operation of agricultural system 140 in more detail, a description of some of the items in system 140, and their operation, will first be provided.

Position sensor 146 can be a global navigation satellite system (GNSS) receiver, a dead reckoning system, a cellular triangulation system, or any of a wide variety of other systems that identify the coordinates or location of leading vehicle 101 in a global or local coordinate system. Data store 144 can store dimension information and orientation information, such as information that identifies the location and orientation of optical sensor 106 relative to the material conveyance system (e.g., blower, spout, flap, etc.) 186. Data store 144 can store calibrated offset values described in greater detail elsewhere here, as well as other information.

Communication system 148 enables the communication of items on vehicle 101 with other items on vehicle 101, as well as communication with following vehicle 136 and other communication. Therefore, communication system 148 can be a controller area network (CAN) bus and bus controller, a cellular communication device, a Wi-Fi communication device, a local or wide area network communication device, a Bluetooth communication device, and/or any of a wide variety of devices or systems that enable communication over different types of networks or combinations of networks.

Receiving vehicle sensors 152 sense the receiving vehicle 134 and/or parameters of receiving vehicle 134. In the example discussed herein, the parameters of receiving vehicle 134 are structural portions of receiving vehicle 134 that allow the location of the receiving area of receiving vehicle 134 to be determined. The receiving vehicle parameters, for example, may be the front wall or top front edge of the receiving vehicle 134, the side walls or top side edges of receiving vehicle 134, the rear wall or the top rear edge of receiving vehicle 134, etc. Therefore, optical sensor 169 can include camera 106 and image processor 171. During the calibration process, camera 106 can capture an image (static or video) of receiving vehicle 134 and image processor 171 can identify the location of the receiving vehicle parameters within that image. Thus, image processor 171 can identify the location of the front wall or front edge of receiving vehicle 134 within the captured image, and/or the other receiving vehicle parameters. In other examples, RADAR sensor 170 and/or LIDAR sensor 172 can be used to identify the receiving vehicle parameters in different ways. Sensors 170 and 172 can have signal processing systems that process the signals generated by RADAR and LIDAR sensors to identify the receiving vehicle parameters.

Unloading control system 150 controls the unloading process by which material conveyance subsystem 186 conveys material from leading vehicle 101 to receiving vehicle 134. Following vehicle/receiving vehicle pair detector 160 detects the identity of following vehicle 136 and receiving vehicle 134 (e.g., the identity of this tractor/cart pair). Offset value management system 161 can then determine whether calibration data (e.g., calibration offset value(s)) have already been generated for this particular pair of vehicles. If so, offset value management system 161 can retrieve the calibration data such as calibrated offset values 147 from data store 144 and provide those values to vehicle position detection system 164 so the values can be used to locate receiving vehicle 134 and to control the unloading process. Offset value management system 161 can receive vehicle parameter offset values from calibration system 162 (e.g., as calibrated offset values) or from operator inputs from operator 194 and/or operator 208 or from other places. System 161 then stores the vehicle parameter offset values 147. Values 147 can be indexed in data store 144 by an identifier for following vehicle 136 (e.g., the VIN), by the model number or other identifier, by a receiving vehicle identifier of one or both vehicles 134, 136, by a vehicle pair identifier, or otherwise. System 161 can also identify a mismatch between the vehicle parameter offset values 147 that have been returned and the actual vehicle parameter offset values for the following vehicle/receiving vehicle pair. For example, if the operator of following vehicle 136 hooks up a different receiving vehicle, this can be identified and processed by system 161 to notify the operator(s) and/or to obtain the correct vehicle parameter offset values, as is described in greater detail below with respect to FIGS. 10-12. If calibrated offset values have not yet been generated for this following vehicle 136/receiving vehicle 134 pair, then calibration system 162 can be used to perform a calibration operation for this particular following vehicle 136/receiving vehicle 134 pair.

The calibration operation identifies the location of the receiving vehicle parameters (e.g., the front wall, rear wall, side walls, etc., of the receiving vehicle) relative to a reference location on the following vehicle 136 (e.g., relative to the hitch point 137, wheelbase, etc. of following vehicle 136). The calibration operation can also identify the location of hitch point 137 relative to the position sensor 196 or other known location on following vehicle 136. These locations are referred to as the calibrated offset values for this particular following vehicle/receiving vehicle pair. The calibrated offset values can then be stored in data store 144 for use in identifying the location of receiving vehicle 134 and controlling the unloading operation.

Vehicle position detection system 164 detects the position of leading vehicle 101 and following vehicle 136 either in terms of absolute coordinates within a global or local coordinate system, or in terms of a relative position in which the positions of vehicles 101 and 136 are determined relative to one another. For instance, vehicle position detection system 164 can receive an input from position sensor 146 on vehicle 101 and from position sensor 196 (which may also be a GNSS receiver, etc.) on following vehicle 136 to determine where the two vehicles are located relative to one another. Vehicle position detection system 164 can then detect the location of receiving vehicle 134 relative to the material conveyance subsystem 186 using the calibration offset value for this particular following vehicle/receiving vehicle pair and/or using a dynamic model as described elsewhere herein, such as below with respect to FIGS. 13A-15B.

For instance, by knowing the location of following vehicle 136, and by knowing the calibrated offset values, which locate the walls (or other receiving vehicle parameter(s)), of receiving vehicle 134 relative to a reference position on following vehicle 136, vehicle position detection system 164 can identify the location of the walls of receiving vehicle 134 relative to the material conveyance subsystem 186 on leading vehicle 101. In another example, by knowing the route and location of following vehicle 136, and by knowing the location of hitch point 137, position detection system 164 can use a dynamic model that models the kinematics of receiving vehicle 134 to identify the location of receiving vehicle 134 relative to the material conveyance subsystem 186 on leading vehicle 101. This location can then be used to determine how to control vehicles 101 and 136 to perform an unloading operation so that material conveyance system 186 loads material into receiving vehicle 134 according to a desired fill pattern.

Control signal generator 166 generates control signals that can be used to control vehicle 101 and following vehicle 136 to accomplish the desired fill pattern. For instance, control signal generator 166 can generate control signals to control the material conveyance subsystem 186 to start or stop material conveyance, to control the spout position or flat position in order to control the trajectory of material that is being conveyed to receiving vehicle 134, or to control the propulsion system 188 or steering subsystem 190. Control signal generator 166 can also generate control signals that are sent by communication system 148 to the following vehicle 136 to "nudge" the following vehicle forward or rearward relative to leading vehicle 101, to instruct the operator 208 of following vehicle 136 to perform a desired operation, or to generate other control signals.

Header subsystem 184 controls the header of the harvester. Material conveyance subsystem 186 may include a blower, spout, flap, auger, etc., which control conveyance of harvested material from leading vehicle 101 to receiving vehicle 134, as well as the trajectory of such material. Propulsion subsystem 188 can be an engine that powers one or more different motors, electric motors, or other systems that provide propulsion to leading vehicle 101. Steering subsystem 190 can be used to control the heading and forward/backward directions of travel of leading vehicle 101. Optical sensor positioning subsystem 191 can be a controllable actuator that points or aims or otherwise controls the orientation of optical sensor 169 to change the location of the field of view of sensor 169 (or other sensors).

Operator interface system 154 can generate interfaces for operator 194 and receive inputs from operator 194. Therefore, operator interface system 154 can include interface mechanisms such as a steering wheel, joysticks, pedals, buttons, displays, levers, linkages, etc. Interface generation system 176 can generate interfaces for interaction by operator 194, such as on a display screen, a touch sensitive displays screen, or in other ways. Output generator 178 outputs that interface on a display screen or in other ways and operator interaction detector 180 can detect operator interactions with the displayed interface, such as the operator actuating icons, links, buttons, etc. Operator 194 can interact with the interface using a point and click device, touch gestures, speech commands (where speech recognition and/or speech synthesis are provided), or in other ways.

As mentioned above, position sensor 196 on following vehicle 136 may be a global navigation satellite system (GNSS) receiver, a dead reckoning system, a cellular triangulation system, or any of a wide variety of other systems that provide coordinates of following vehicle 136 in a global or local coordinate system, or that provide an output indicating the position of following vehicle 136 relative to a reference point (such as relative to leading vehicle 101), etc. Communication system 198 allows the communication of items on vehicle 136 with one another, and also provides for communication with leading vehicle 101, and/or other systems. Therefore, communication system 198 can be similar to communication system 148 discussed above, or different. It will be assumed for the purpose of the present discussion that communication systems 148 and 198 are similar, although this is for the sake of example only. Data store 200 can store dimension data which identify different dimensions of following vehicle 136, the location and/or orientation of different sensors on vehicle 136, kinematic information describing vehicle 134 and/or vehicle 136, and other information. Control system 202 can be used to receive inputs and generate control signals. The control signals can be used to control communication system 198, operator interface system 204, data store 200, the propulsion and/or steering subsystem on following vehicle 136, and/or other items. Operator interface system 204 can also include operator interface mechanisms, such as a steering wheel, joysticks, buttons, levers, pedals, linkages, etc. Operator interface system 204 can also include a display screen that can be used to display operator interfaces for interaction by operator 208. Operator 208 can interact with the operator interfaces using a point and click device, touch gestures, voice commands, etc.

Identifier 210 on receiving vehicle 134 may be visual indicia, or electronic indicia, or another item that specifically identifies receiving vehicle 134. Identifier 210 may also simply be the make or model of receiving vehicle 134, or another marker that identifies receiving vehicle 134.

Figure 5:
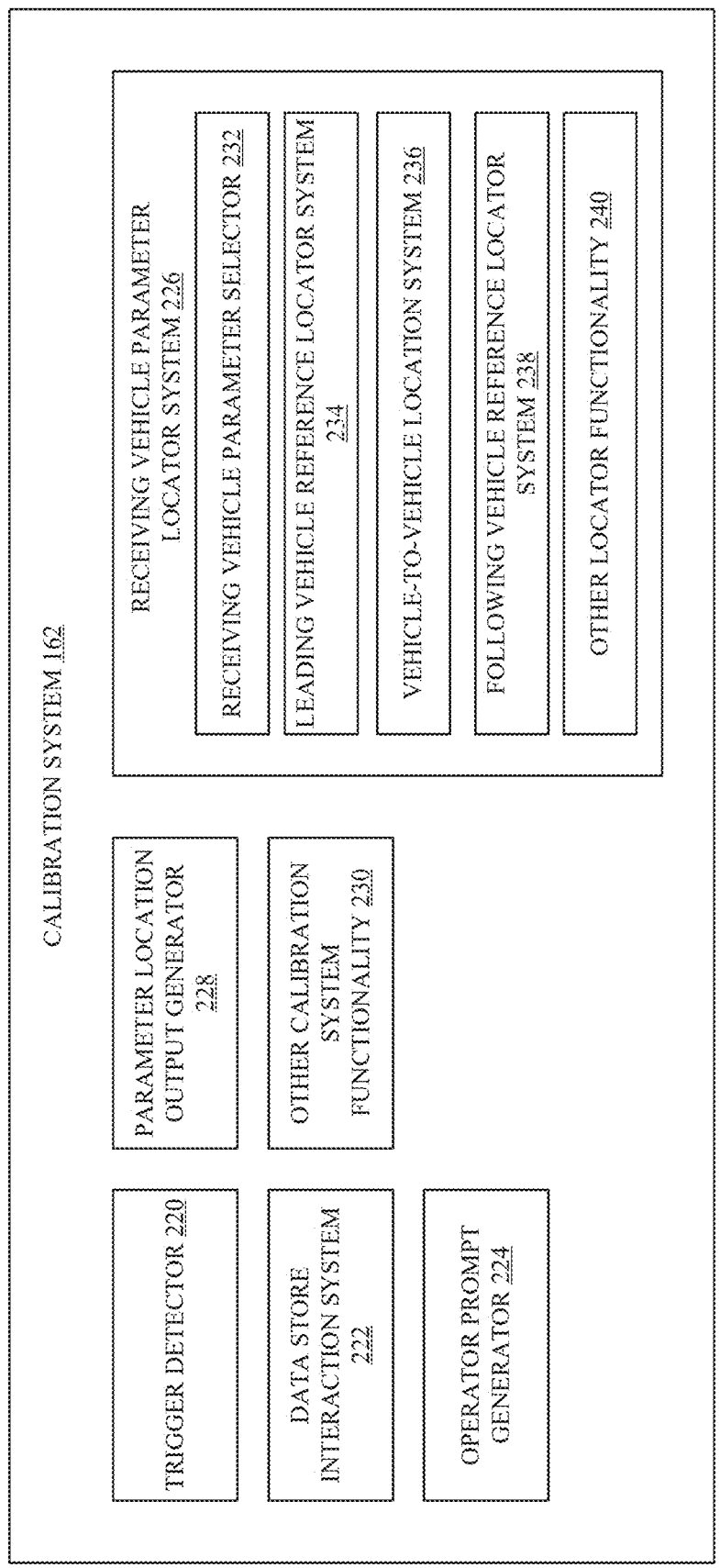
FIG. 5 is a block diagram of one example of a calibration system.

FIG. 5 is a block diagram showing one example of calibration system 162 in more detail. In the example shown in FIG. 5, calibration system 162 includes trigger detector 220, data store interaction system 222, operator prompt generator 224, receiving vehicle parameter locator system 226, parameter location output generator 228, and other calibration system functionality 230. Receiving vehicle parameter locator system 226 includes receiving vehicle parameter selector 232, leading vehicle reference locator system 234, vehicle-to-vehicle location system 236, following vehicle reference locator system 238, and other locator functionality 240. Before describing the operation of calibration system 162 in more detail, a description of some of the items in calibration system 162, and their operation, will first be described.

Trigger detector 220 detects a trigger indicating that calibration system 162 is to perform a calibration operation to identify the calibrated offset value that locates one or more receiving vehicle parameters (front wall, rear wall, side walls, etc.) relative to a reference point on a following vehicle (e.g., a towing vehicle or tractor that is providing propulsion to the receiving vehicle). In one example, trigger detector 220 detects an operator input indicating that the operator wishes to perform a calibration operation. In another example, the receiving vehicle sensors 152 (shown in FIG. 4) may detect a new following vehicle/receiving vehicle pair for which no calibrated offset value has been generated. This may trigger the calibration system 162 to perform a calibration operation. The calibration system may be triggered by leading vehicle 101 beginning to perform a harvesting operation (e.g., where the harvesting functionality is engaged) or for other reasons.

Operator prompt generator 224 then prompts the operators of one or more of leading vehicle 101 and following vehicle 136 to position receiving vehicle 134 so that the receiving vehicle parameter may be detected by one or more of the receiving vehicle sensors 152. For instance, where the receiving vehicle sensors 152 include an optical sensor (such as camera 106) then the prompt may direct the operators of the vehicles to move the vehicles in place relative to one another so that the camera 106 can capture an image of the receiving vehicle parameters and so that those parameters can be identified by image processor 171 within the image.

Figure 6:
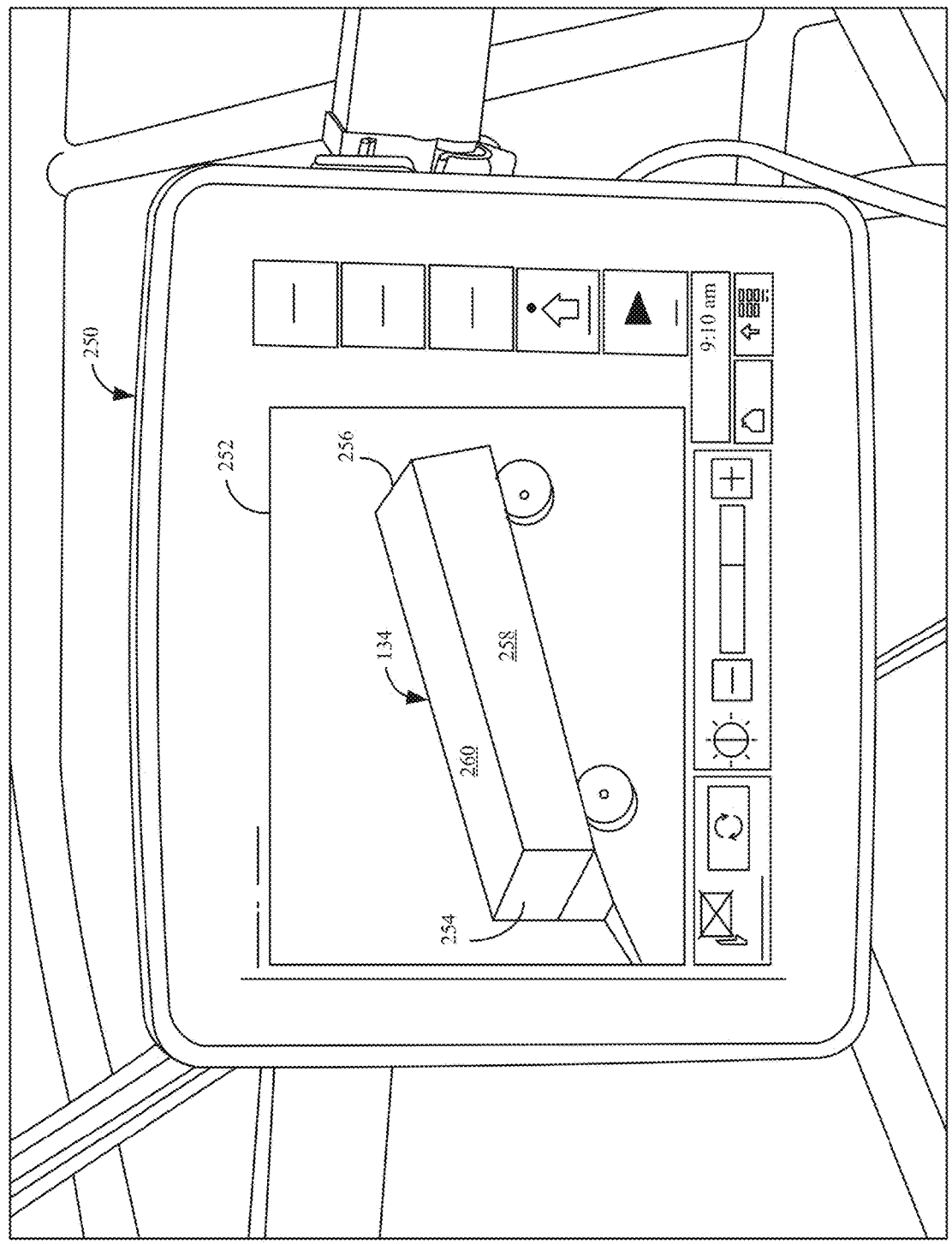
FIG. 6 is one example of an operator interface display.

FIG. 6, for instance, shows one example of a user interface display device 250 displaying a display 252 that can be generated for the operator of either leading vehicle 101 or following vehicle 136 or both. Operator interface display 252 includes displays an image (static or video) taken by camera 106. In the example shown in FIG. 6, the operators have moved the vehicles into position relative to one another so that an image of receiving vehicle 134 can be captured by camera 106. In the example shown in FIG. 6, receiving vehicle 134 includes a front wall 254, a rear wall 256, a near wall 258 (which is near camera 106), and a far wall 260 which is further from camera 106 than near wall 258). The top edges of each of the walls 254-260 are also visible in the image illustrated in display 252.

Returning to the description of FIG. 5, data store interaction system 222 can interact with data store 144 to obtain dimension information indicating the location and orientation of camera 106 (or other receiving vehicle sensors 152) that is used to detect the receiving vehicle parameters. Image processor 171 then processes the image to identify the receiving vehicle parameters (such as the walls 254-260) within the captured image. Receiving vehicle parameter locator system 226 can then process the location of the receiving vehicle parameters in the captured image to identify the location of the receiving vehicle parameters relative to a reference point on the following vehicle (e.g., tractor) 134. In doing so, receiving vehicle parameter selector 232 selects which receiving vehicle parameter is to be processed first (such as front wall 254, rear wall 256, or side walls 258 and/or 260). Leading vehicle reference locator system 234 then identifies the location of the selected parameter (for purposes of the present description it will be assumed that the selected receiving vehicle parameter is front wall 254) relative to a reference point on the leading vehicle 101. For instance, system 234 can identify the location of the front wall 254 of receiving vehicle 134 relative to the location of the GPS receiver (or other position sensor) 146 on leading vehicle 101. Vehicle-to-vehicle location system 236 then communicates with the following vehicle 136 to identify the location of leading vehicle 101 relative to the location of following vehicle 136. In particular, system 236 may identify the location of the position sensor 146 on leading vehicle 101 relative to the location of the position sensor 196 on following vehicle 136.

Following vehicle reference locator system 238 then identifies the location of the selected parameter (the front wall 254) of receiving vehicle 134 relative to the reference point on following vehicle 136. For instance, where the reference point on following vehicle 136 is the hitch point 137, then following vehicle reference locator system 238 first identifies the location of front wall 254 relative to the position sensor 196 on following vehicle 136 and then, using dimension information or other information about following vehicle 136, identifies the offset between the reference position (e.g., the hitch point 137) on following vehicle 136 and the position sensor 196 on following vehicle 136. Once this offset is known, then the location of the front wall 254 of receiving vehicle 134 to the hitch can be calculated by following vehicle reference locator system 238. The result is that system 238 generates an output indicating the location of the selected receiving vehicle parameter (in this case the front wall 254 of receiving vehicle 134) relative to the reference point on the following vehicle 136 (in this case the hitch of following vehicle 136). This is referred to herein as the calibrated offset value.

Parameter location output generator 228 generates an output from calibration system 162 to store the calibration offset value in data store 144 for his particular following vehicle 136/receiving vehicle 134 pair. Thus, when vehicle position detection system 164 on leading vehicle 101 encounters this following vehicle 136/receiving vehicle 134 pair during the harvesting operation, the calibrated offset value can be retrieved and used in controlling the unloading operation during which harvested material is unloaded from leading vehicle 101 into receiving vehicle 134.

Figure 7A:
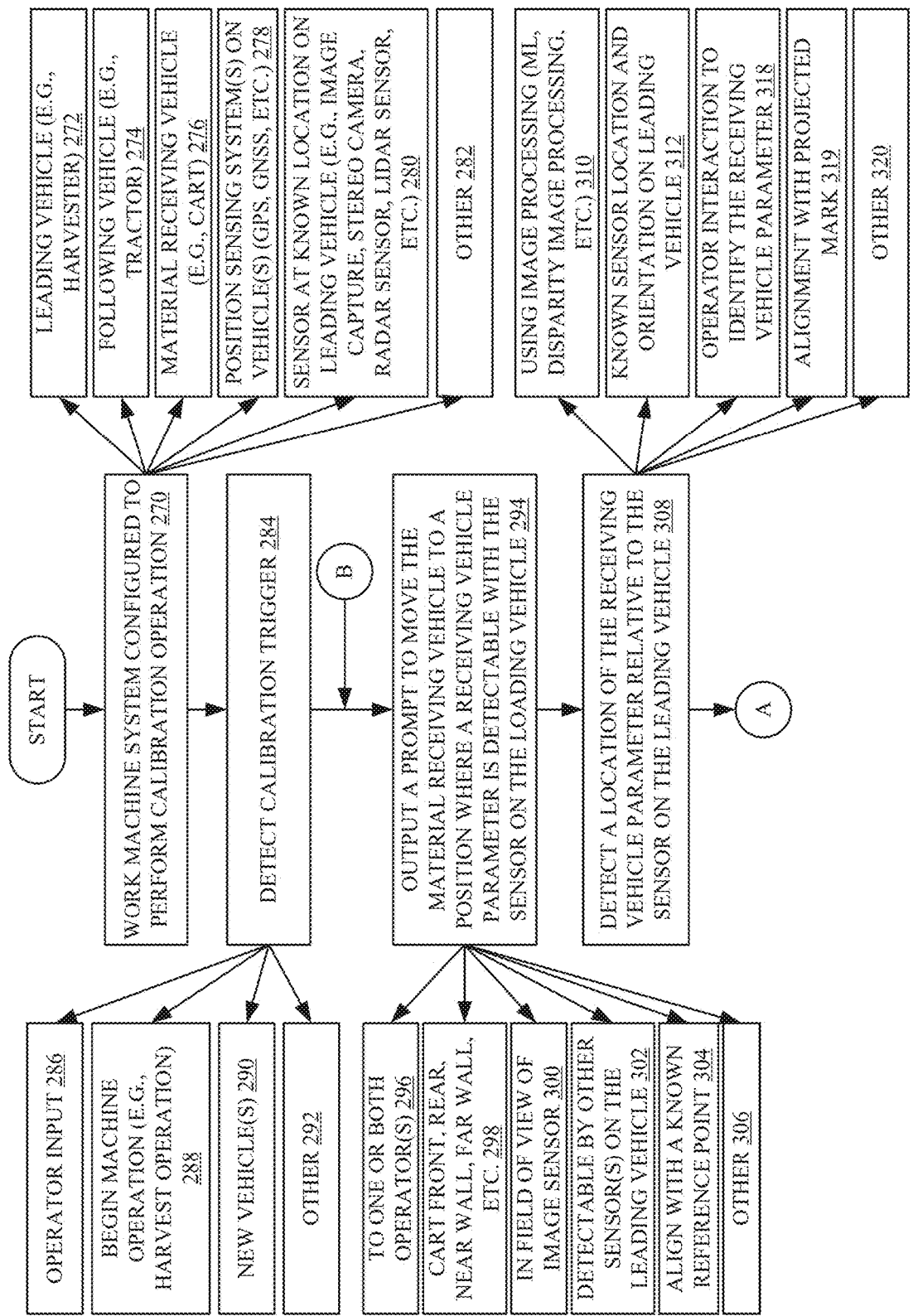
FIGS. 7A and 7B (collectively referred to as FIG. 7) show a flow diagram illustrating an example operation of a harvesting machine.
Figure 7B:
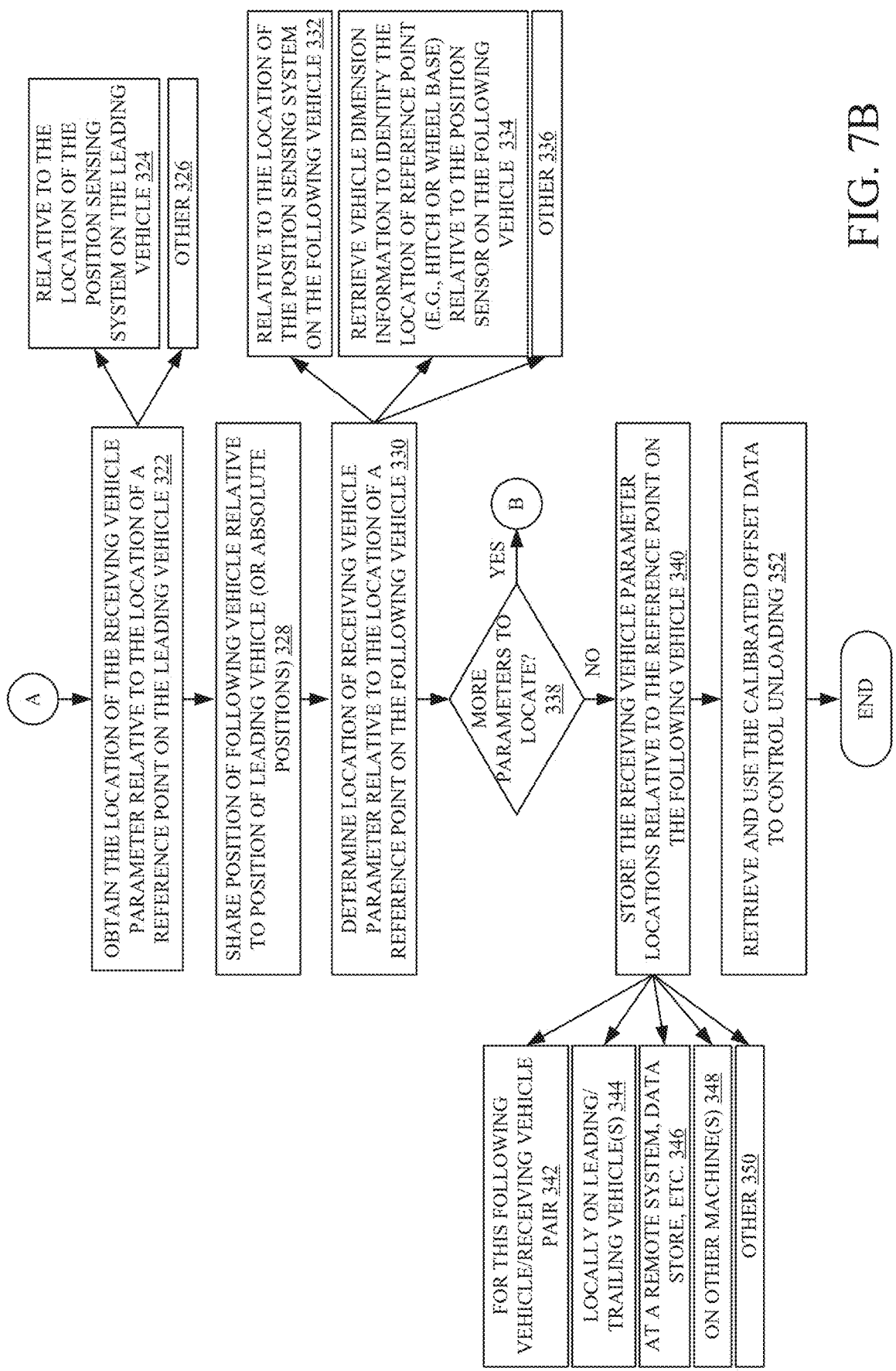

FIGS. 7A and 7B (collectively referred to herein as FIG. 7) show a flow diagram illustrating one example of the operation of agricultural system 140 in performing a calibration operation to identify the calibrated offset value corresponding to one or more receiving vehicle parameters of receiving vehicle 134. It is first assumed that the work machines are configured so that a calibration operation can be performed, as indicated by block 270 in the flow diagram of FIG. 7. In one example, the leading vehicle 101 is a harvester as indicated by block 272 and the following vehicle is a tractor or other towing vehicle as indicated by block 274. Also in the example, the receiving vehicle is a grain cart as indicated by block 276. Also, in the present example, it is assumed that both the leading vehicle and the following vehicle have a position sensing system 146, 196, respectively, as indicated by block 278 in the flow diagram of FIG. 7. Further, it is assumed that leading vehicle 101 has a receiving vehicle sensor 152 that is at a known location and orientation on leading vehicle 101, as indicated by block 280 in the flow diagram of FIG. 7. The receiving vehicle sensor 152 may be an image capture device, such as a stereo camera 106, a RADAR sensor 170, a LIDAR sensor 172, etc. The work machines may be configured in other ways to perform the calibration operation as well, as indicated by block 282 in the flow diagram of FIG. 7.

Detecting a calibration trigger is indicated by block 284 in the flow diagram of FIG. 7. In one example, operator 194 may provide an operator input through operator interface system 154 to trigger a calibration operation for the following vehicle 136/receiving vehicle 134 pair. Detecting a trigger based on an operator input is indicated by block 286 in the flow diagram of FIG. 7. Calibration trigger detector 220 may detect a trigger based upon leading vehicle 101 beginning to perform the harvesting operation, which may be detected by detecting engagement of the header or other harvesting functionality, or in another way. Detecting a trigger based upon the beginning of the machine operation is indicated by block 288 in the flow diagram of FIG. 7. The calibration trigger may be detected based on following vehicle/receiving vehicle pair detector detecting that the current following vehicle/receiving vehicle pair is a new pair for which no calibration offset data has been generated. Detecting a trigger based on the detection of a new vehicle (one for which no calibration offset data is stored) is indicated by block 290 in the flow diagram of FIG. 7. The calibration trigger can be detected in a variety of other ways, based upon other trigger criteria as well, as indicated by block 292 in the flow diagram of FIG. 7.

Once the calibration operation has been triggered, operator prompt generator 224 generates a prompt that can be displayed or otherwise output to operator 194 and/or operator 208 by operator interface systems 154, 204, respectively. The prompt prompts the operator, to move the vehicles so the material receiving vehicle 134 is in a position where at least one of the receiving vehicle parameters is detectable by the receiving vehicle sensor(s) 152 on leading vehicle 101. Outputting such a prompt is indicated by block 294 in the flow diagram of FIG. 7, and outputting the prompt to one or both operators is indicated by block 296. Again, the receiving vehicle parameters to be detected may include the front wall 254, rear wall 256, near wall 258, far all 260, etc., as indicated by block 298 in the flow diagram of FIG. 7.

Therefore, for instance, the operators 194, 208 of the vehicles 101, 136 may position receiving vehicle 134 so that the receiving vehicle parameter to be located is in the field of view of the image sensor or camera 106, as indicated by block 300 in the flow diagram of FIG. 7. In another example, the receiving vehicle parameter to be located is detectable by one of the other sensors 170-174 on leading vehicle 101, as indicated by block 302 in the flow diagram of FIG. 7. In yet another example, the receiving vehicle parameter to be located (e.g., the front wall 254 of vehicle 134) is aligned with a known point of reference on leading vehicle 101. For instance, it may be that the spout 108 on the combine harvester 101 is at a known location relative to the position sensor 146 on combine harvester 101. In that case, the front wall 254 of receiving vehicle 134 may be aligned with the spout 108 so that the location of front wall 254, relative to the reference point (e.g., spout 108) on leading vehicle 101 is known. Aligning the receiving vehicle parameter to be located with a known reference point on the leading vehicle 101 is indicated by block 304 in the flow diagram of FIG. 7. The prompt can be output to the operators in other ways as well, as indicated by block 306 in the flow diagram of FIG. 7.

Leading vehicle reference locator system 234 then detects a location of the receiving vehicle parameter (e.g., front wall 254) relative to the sensor 152 on the leading vehicle as indicated by block 308 in the flow diagram of FIG. 7. In one example, camera 106 captures an image of receiving vehicle 134 and image processor 171 processes the image captured by camera 106 using a machine learned processor, or disparity image processor, etc., in order to identify the location of the receiving vehicle parameter (e.g., front wall 254) in the captured image, as indicated by block 310. System 234 can then obtain data identifying the known sensor location and/or orientation of the receiving vehicle sensor 152 (e.g., camera 106) on leading vehicle 101, as indicated by block 312. System 234 uses the location of the front wall 254 in the captured image and the location and orientation of the camera 106 to calculate the location of front wall 254 relative to camera 106.

Figure 8:
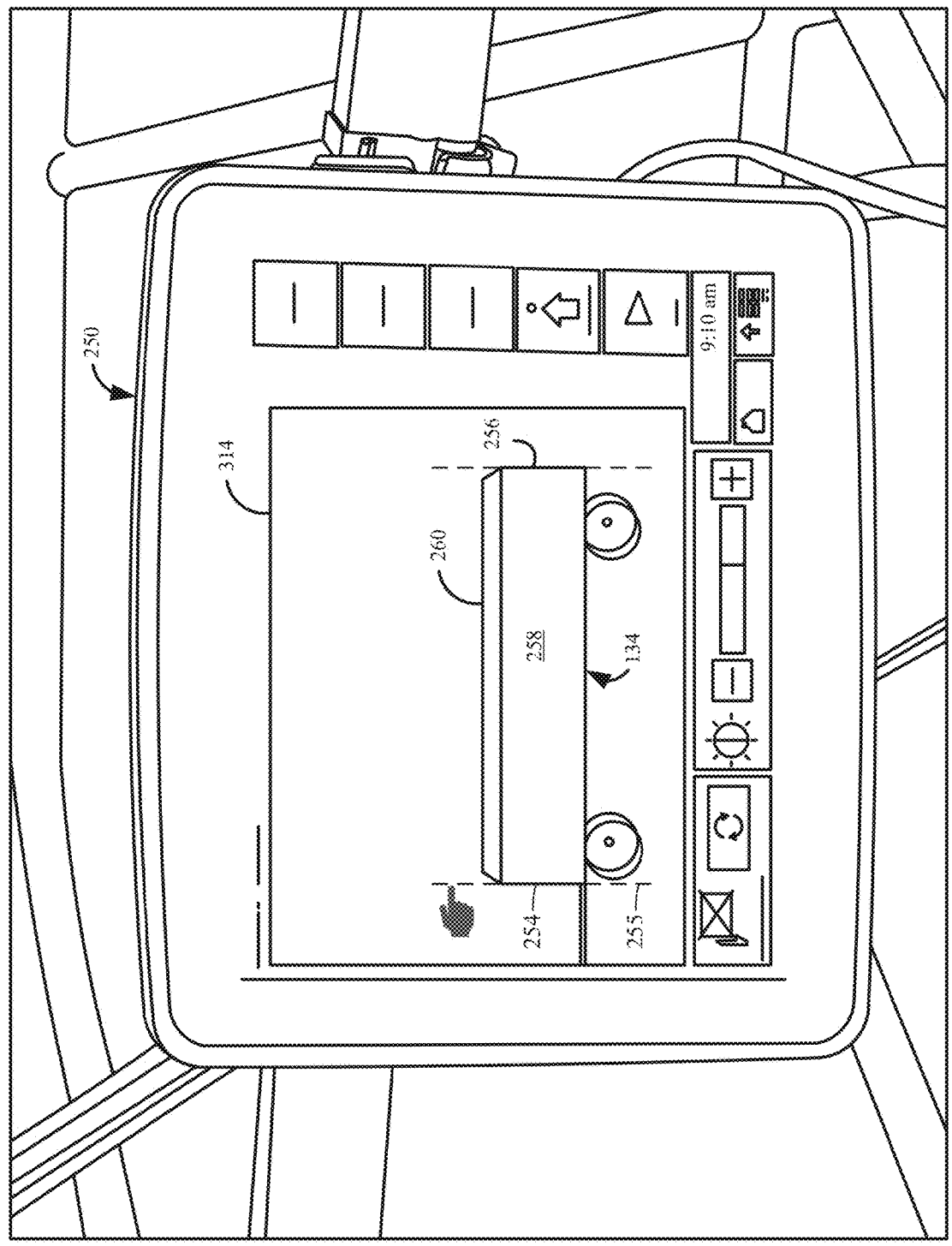
FIGS. 8 and 9 show examples of operator interface displays.

It will be noted that, instead of using image processing to identify the location of front wall 254 (or another receiving vehicle parameter) in the captured image, an operator input can be used to identify the receiving vehicle parameter in the captured image. FIG. 8, for instance, shows one example of an operator interface display 314 on a display device 250 displaying a side view of the receiving vehicle 134. The side view is slightly elevated so that the front wall 254, rear wall 256, near wall 258, and far wall 260, of receiving vehicle 134 are all visible. In the example shown in FIG. 8, operator 194 can use a touch gesture (or point and click device) to trace along the front wall 254 (as indicated in FIG. 8) to identify the location of front wall 254 in the captured image. Also, of course, where the receiving vehicle parameter to be located is the rear wall, or the side walls, operator 194 can trace along those walls.

In another example, system 226 can project a line on the video displayed to the operator and the operator can then align the receiving vehicle parameter (e.g., front wall 254) with the line. For example, in FIG. 8, system 226 can project line 255 on the display 314 (which may be a live video feed from camera 106) so the operator(s) can align front wall 254 with line 255. System 226 knows the pixels used to display line 255. Therefore, once front wall 254 is aligned with line 255 (which can be indicated by an operator input), system 226 will know the location of front wall 254 in the image 314.

Figure 9:
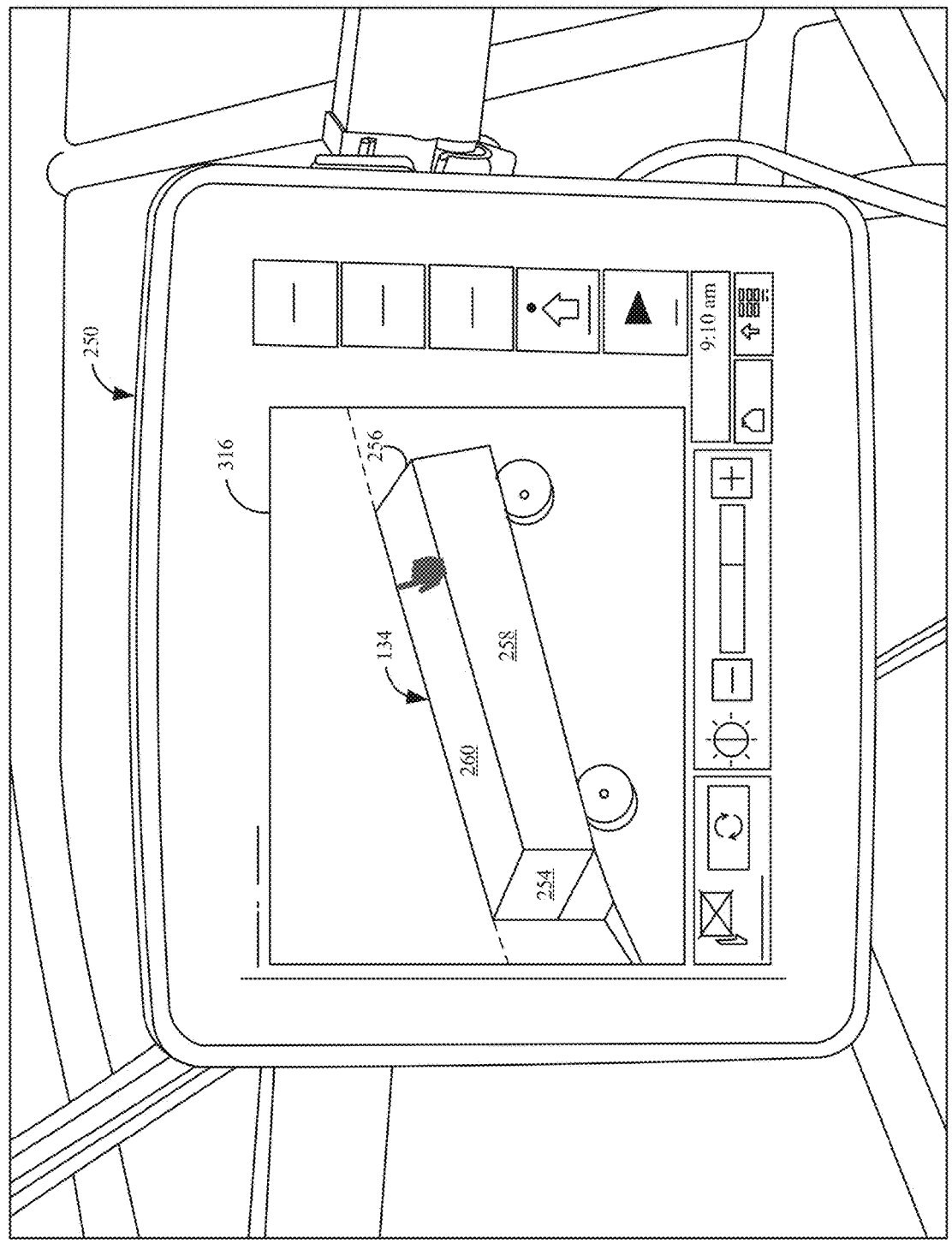

FIG. 9, for example, is similar to FIG. 8 and similar items are similarly numbered. However, the view of receiving vehicle 134 is slightly more elevated and from a slightly different perspective than that shown in FIG. 8. In FIG. 9, it can be seen that the operator has traced along the top edge of the far wall 260 (or a line has been projected at that location and wall 260 has been aligned with the line) to identify the location of the far wall 260 in the displayed image 316. Identifying the receiving vehicle parameter (e.g., one of walls of the receiving vehicle or top edge of the wall, etc.) based on operator interaction with the displayed image is indicated by block 318 in the flow diagram of FIG. 7. Projecting a line and aligning the receiving vehicle parameter with the line is indicated by block 319. Detecting a location of the receiving vehicle parameter in the image and relative to the camera 106 can be done in other ways as well, as indicated by block 320.

Again, once the location of the receiving vehicle parameter is identified in the image, then using the known location and orientation of the camera 106, the location of the receiving vehicle parameter can be identified relative to one or more other reference points on receiving vehicle 101.

Calculating or otherwise obtaining the location of the receiving vehicle parameter relative to the location of a reference point on the leading vehicle 101 is indicated by block 322 in the flow diagram of FIG. 7. In one example, the reference point on leading vehicle 101 is the location of the position sensor 146. Thus, leading vehicle reference locator system 234 identifies the location of the receiving vehicle parameter (e.g., front wall 254) on receiving vehicle 134 relative to the location of the position sensor 146 on leading vehicle 101, as indicated by block 324 in the flow diagram of FIG. 7. Of course, where the reference point is a different reference point on leading vehicle 101, then the location of the receiving vehicle parameter (e.g., front wall 254) relative to that reference point can be calculated as well. Identifying the location of the receiving vehicle parameter relative to the location of another reference point on leading vehicle 101 is indicated by block 326 in the flow diagram of FIG. 7.

Vehicle-to-vehicle location system 236 uses communication system 148 and communication system 198 to communicate with one another so that the position of following vehicle 136 can be identified relative to the position of the leading vehicle 101 as indicated by block 328. In one example, the position of one vehicle relative to the other can be calculated using the absolute positions of both vehicles sensed by the corresponding position sensors 146 and 196. In another example, other sensors can be used (such as RADAR, LIDAR, etc.) to detect the relative position of the two vehicles.

Once vehicle-to-vehicle location system 236 identifies the relative locations of the two vehicles relative to one another, then following vehicle reference locator system 238 can identify the location of the receiving vehicle parameter (e.g., front wall 254) relative to the coordinates of a reference point on the following vehicle 136, as indicated by block 330 in the flow diagram of FIG. 7. The reference point on following vehicle 136 can be any of a wide variety of different reference points, such as the location of the position sensor 196, the location of a hitch or wheelbase, etc. Determining the location of the receiving vehicle parameter (e.g., front wall 254) relative to the location of position sensor 196 on following vehicle 136 is indicated by block 332 in the flow diagram of FIG. 7. Determining the location of the receiving vehicle parameter (e.g., front wall 254) relative to the hitch or wheelbase of the following vehicle 136 can be done by retrieving vehicle dimension information from data store 200 or data store 144 or elsewhere, where the dimension information identifies the location of the reference point relative to the position sensor 196. Identifying the location of the receiving vehicle parameter relative to another reference point on following vehicle 136 in this way is indicated by block 334 in the flow diagram of FIG. 7. The location of the receiving vehicle parameter (e.g., front wall 254) relative to the location of a reference point on the following vehicle 136 can be done in a wide variety of other ways as well, as indicated by block 336 in the flow diagram of FIG. 7.

When more receiving vehicle parameters (e.g., rear wall, side walls, etc.) are to be located relative to the reference point on following vehicle 136, as indicated by block 338 in the flow diagram of FIG. 7, processing reverts to block 294 where the operators are prompted to position the two vehicles relative to one another so that the next receiving vehicle parameter can be detected by the receiving vehicle sensors 152 (e.g., camera 106) on leading vehicle 101. It will be noted that, in one example, the location of the receiving vehicle parameters relative to a reference position on the following vehicle 136 can be determined or calculated in a priority order. The priority may be to first locate the front wall 254, then the rear wall 256, then the near wall 258 and finally the far wall 260. In another example, only the front wall 254 is located and then known dimensional information (e.g., the length of the receiving vehicle 134) is used to identify the location of the rear wall. Similarly, a center point on the front wall 254 can be located and then width information that defines the width dimension of receiving vehicle 134 can be used to locate the side walls 258 and 260. In yet another example, the top edges of the walls 254-260 are identified to define the material-receiving opening in material receiving vehicle 134. These are just examples of the different receiving vehicle parameters that can be located relative to a reference point on the following vehicle 134. Other receiving vehicle parameters can be located as well, and they can be located in different orders.

Parameter location output generator 228 can generate an output indicative of the locations of the receiving vehicle parameters relative to the reference point on the following vehicle 134, as calibrated offset values, to data store interaction system 222 which can store the calibrated offset values in data store 144, data store 200, or elsewhere, where the values can be retrieved by leading vehicle 101 when performing the harvesting operation, and when locating the receiving vehicle 134 during an unloading operation. Storing the receiving vehicle parameter locations relative to the reference point on the following vehicle 136 is indicated by block 340 in the flow diagram of FIG. 7.

In one example, the calibrated offset values are stored and indexed by the particular following vehicle 136/receiving vehicle 134 pair for which the calibrated offset values are calculated, as indicated by block 342 so that the values can be looked up during later operation, when a harvester is unloading to this particular following vehicle 136/receiving vehicle 134 pair (or a similar pair). In one example, the calibration offset values are stored locally in data store 144 on vehicle 101, or locally in data store 200 on following vehicle 136, as indicated by block 344. In another example, the calibrated offset values can be stored remotely in a cloud-based system, in another remote server architecture, on a different machine, or in a different system which can then be accessed by leading vehicle 101 at an appropriate time, as indicated by block 346. In another example, the calibrated offset values can be transmitted to other vehicles (such as other harvesters, etc.) so that the calibration need not be performed by all of the other leading vehicles 101 which may encounter this particular following vehicle 136/receiving vehicle 134 pair. Sending the calibrated offset values to other vehicles is indicated by block 348 in the flow diagram of FIG. 7. The calibrated offset values can be stored in other ways, and used in other ways (such as in controlling the unloading operation during a subsequent process), as indicated by block 350 in the flow diagram of FIG. 7. Retrieving and using the calibrated offset values to control an unloading operation is indicated by block 352 in the flow diagram of FIG. 7.

Figure 10:
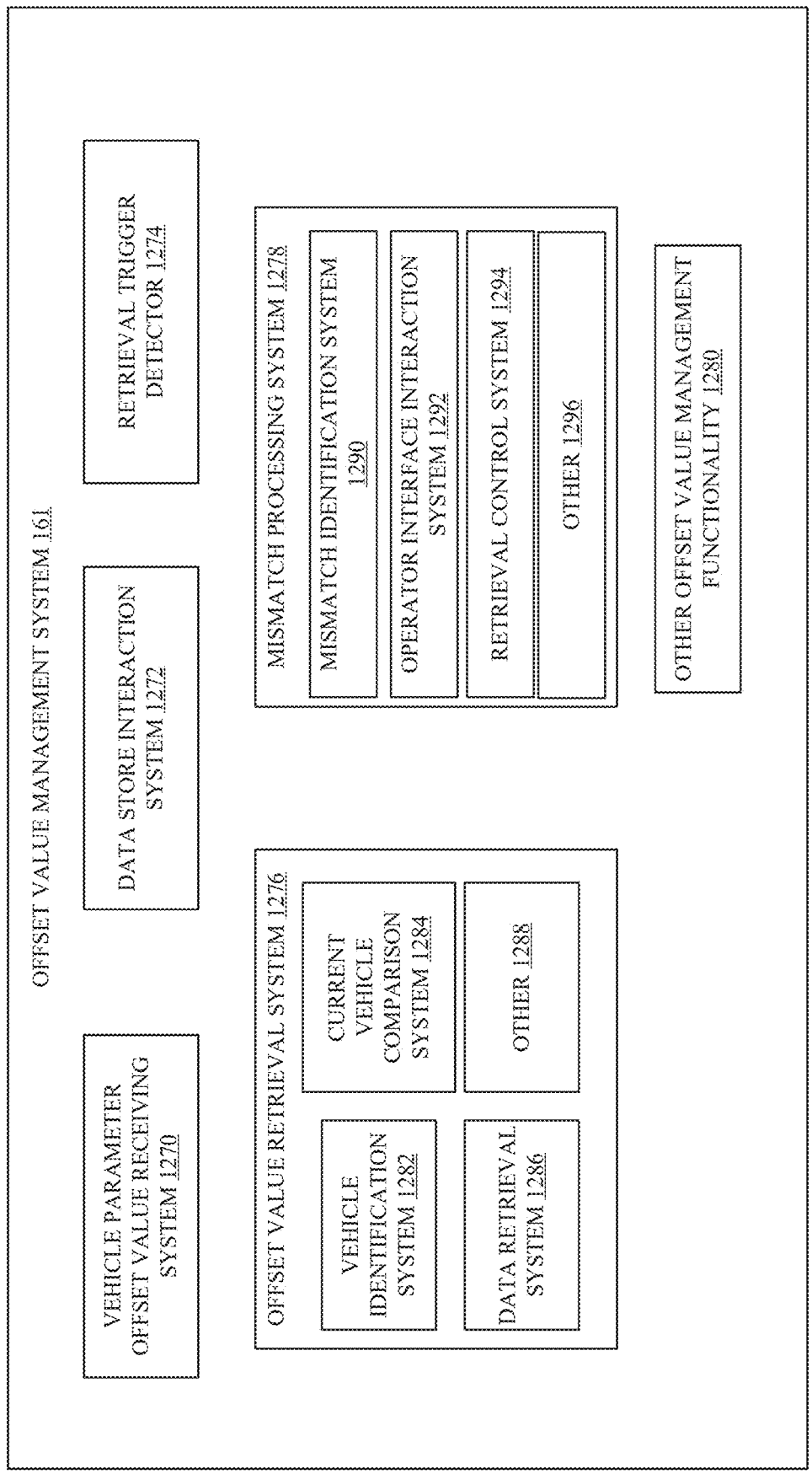
FIG. 10 is a block diagram of one example of an offset value management system in more detail.

FIG. 10 is a block diagram showing one example of offset value management system 161 in more detail. In the example shown in FIG. 10, offset value management system 161 includes vehicle parameter offset value receiving system 1270, data store interaction system 1272, retrieval trigger detector 1274, offset value retrieval system 1276, mismatch processing system 1278, and other offset value management functionality 1280. Offset value retrieval system 1276 can include vehicle identification system 1282, current vehicle comparison system 1284, data retrieval system 1286, and other items 1288. Mismatch processing system 1278 can include mismatch identification system 1290, operator interface interaction system 1292, retrieval control system 1294, and other items 1296. Before describing the operation of offset value management system 161 in more detail, a description of some of the items in system 161, and their operation, will first be provided.

Vehicle parameter offset value receiving system 1270 receives vehicle parameter offset values so that they can be stored and managed. In one example, system 1270 controls operator interface system 154 to generate an operator interface that allows operator 194 to enter the vehicle parameter offset values, manually. In another example, system 1270 can use communication system 148 to communicate with operator interface system 1204 on vehicle 136 to generate an operator interface so that operator 1208 can enter the vehicle parameter offset values manually. Those values can then be communicated back to vehicle parameter offset value receiving system 1270. In another example, system 1270 can receive, as the vehicle parameter offset values, the calibrated offset values from calibration system 162.

System 1270 can then use data store interaction system 1272 to interact with data store 144 to store the vehicle parameter offset values as calibrated offset values 147. In one example, values 147 are indexed by a vehicle identifier, such as an identifier that identifies the following vehicle 136/receiving vehicle 134 pair, by the VIN of the following vehicle, by a vehicle identifier that identifies the receiving vehicle 134, or in other ways. The values 147 can be stored in a look-up table or in another data structure.

Thus, when following/receiving vehicle pair detector 160 encounters following vehicle 136/receiving vehicle 134 pair (such as when a pair approaches leading vehicle 101 for unloading), the corresponding vehicle identifier can be obtained and the vehicle parameter offset values can be easily obtained from data store 144 using the corresponding vehicle identifier. In another example, system 1270 uses data store interaction system 1272 to store the vehicle parameter offset values based upon the model number of the receiving vehicle 134 or a combination of the model numbers of the following vehicle 136 and receiving vehicle 134. In this way, when leading vehicle 101 encounters a following vehicle/receiving vehicle pair that is not identically the same as a pair for which vehicle parameter offset values have been generated, but which has the same vehicle model numbers, then the vehicle parameter offset value(s) for that combination of model numbers (the same model number for the following vehicle 136, and the same model number for the receiving vehicle 134) can be used to control the unloading operation.

Retrieval trigger detector 1274 detects a trigger indicating that a set of vehicle parameter offset values 147 should be retrieved. For example, operator 194 may provide an input indicating that it is time to unload into a new following vehicle 136/receiving vehicle 134 pair. In that case, trigger detector 1274 detects this as a trigger indicating that it is time to obtain the vehicle parameter offset values for this particular following vehicle 136/receiving vehicle 134 pair. In another example, the control system 202, or operator 208, of following vehicle 136 may send a signal to leading vehicle 101 indicating that following vehicle 136 is approaching leading vehicle 101 for an unloading operation. In that case, trigger detector 1274 can detect that a new following vehicle 136/receiving vehicle 134 pair is approaching and so the vehicle parameter offset values corresponding to that vehicle pair should be obtained. In yet another example, trigger detector 1274 may detect that the clean grain tank of the leading vehicle 101 is nearly full so that an unloading operation needs to be commenced in the near future, in which case the vehicle parameter offset values can be obtained to prepare for the unloading operation.

Once triggered, offset value retrieval system 1276 retrieves the vehicle parameter offset values for the following vehicle 136/receiving vehicle 134 pair to which the harvested material is to be unloaded, based on a vehicle identifier. Vehicle identification system 1282 identifies a vehicle identifier corresponding to the following vehicle 136/receiving vehicle 134 pair and current vehicle comparison system 1284 determines whether that pair is the same as the pair for which the vehicle parameter offset values are currently loaded into the control system. If so, then no additional vehicle parameter offset values need to be retrieved. If not, however, then data retrieval system 1268 uses data store interaction system 1272 to retrieve the vehicle parameter offset values 147 for this particular following vehicle 136/receiving vehicle 134 pair. Those offset values are then loaded into vehicle position detection system 164 so that the unloading operation can be controlled using the correct vehicle parameter offset values.

Mismatch processing system 1278 can detect whether there is a mismatch between the vehicle parameter offset values that are being used for the current following vehicle 136/receiving vehicle 134 pair and the actual offset values for that vehicle pair. For instance, it may be that operator 208 of following vehicle 136 has switched receiving vehicles (e.g., switched grain carts). In that case, the vehicle parameter offset values that are stored and correspond to the VIN number of the following vehicle 136 may not be accurate because they correspond to a different receiving vehicle. Therefore, mismatch identification system 1290 identifies that the vehicle parameter offset values are inaccurate.

Identifying a mismatch can be done in a number of different ways. For instance, system 1290 may identify the receiving vehicle 134, itself, and determine that the identified receiving vehicle 134 is not the same as the receiving vehicle that is assumed to be connected to following vehicle 136. As one example, where the receiving vehicle 134 may include a unique identifier (such as visual indicia, a visual signature or visual characteristic extracted from visual features of the receiving vehicle 134, a transmission device that transmits a unique identifier, or that stores a unique identifier that can be read by mismatch identification system 1290), then the identity of the particular receiving vehicle 134 can be compared against the identity of the receiving vehicle that is assumed to be connected to following vehicle 136 to determine whether they are the same.

If a mismatch is identified (e.g., the receiving vehicle 134 that is actually being used is not the same as that to which the vehicle parameter offset values correspond and that are currently loaded into vehicle position detection system 164) then operator interface interaction system 1292 can generate a notification to operator 194 and/or operator 208. The notification may identify the mismatch, and the notification may also include other information. For instance, the notification may indicate that a calibration operation is automatically being performed, or the notification may provide an operator actuatable button (such as an icon) that can be actuated by one of the operators 194, 208 in order to initiate a calibration operation. In another example, the operator interface can include data input fields which allow one of the operators to input the vehicle parameter offset values for the receiving vehicle 134 that is being used.

It may also be that there are already vehicle parameter offset values 147 stored for this particular following vehicle 136/receiving vehicle 134 pair (even though it was initially assumed that a different receiving vehicle 134 was connected to following vehicle 136). In that case, retrieval control system 1294 can retrieve the already-existing vehicle parameter offset values 147 for this particular following vehicle 136/receiving vehicle 134 pair.

In another example, retrieval control system 1294 can obtain the vehicle parameter offset values from calibration system 162, once the calibration operation has been performed. The retrieval control system 1294 can retrieve the vehicle parameter offset values from the operator interface, once they have been manually entered. The retrieval control system 1294 can retrieve the vehicle parameter offset values for the current following vehicle 136/receiving vehicle 134 pair in other ways as well. Mismatch processing system 1278 can then output the correct calibrated offset values to vehicle position detection system 164 for use in loading material into the receiving vehicle 134.

Figure 11A:
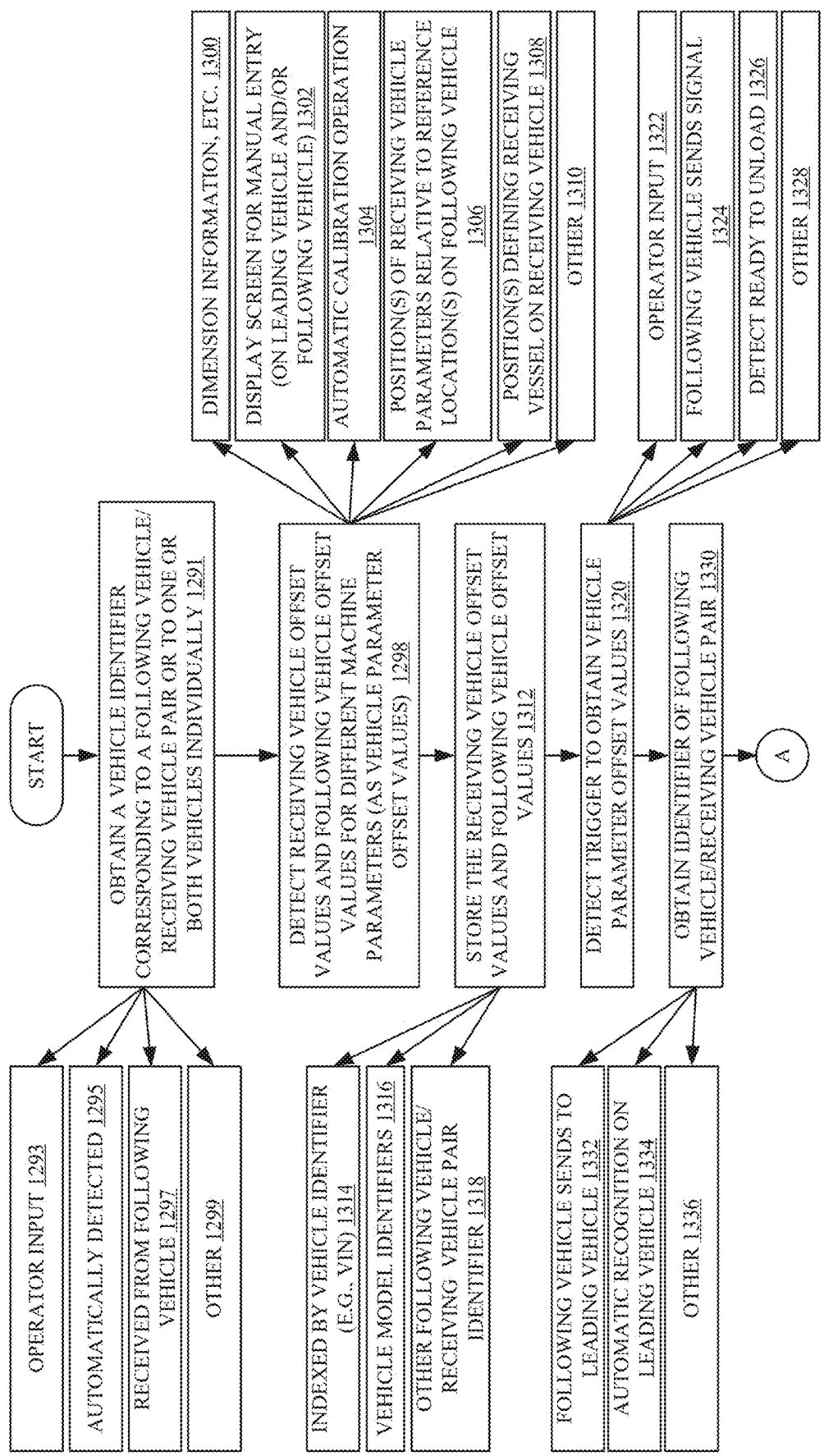
FIGS. 11A and 11B (collectively referred to herein as FIG. 11) show a flow diagram illustrating one example of the operation of an offset value management system.
Figure 11B:
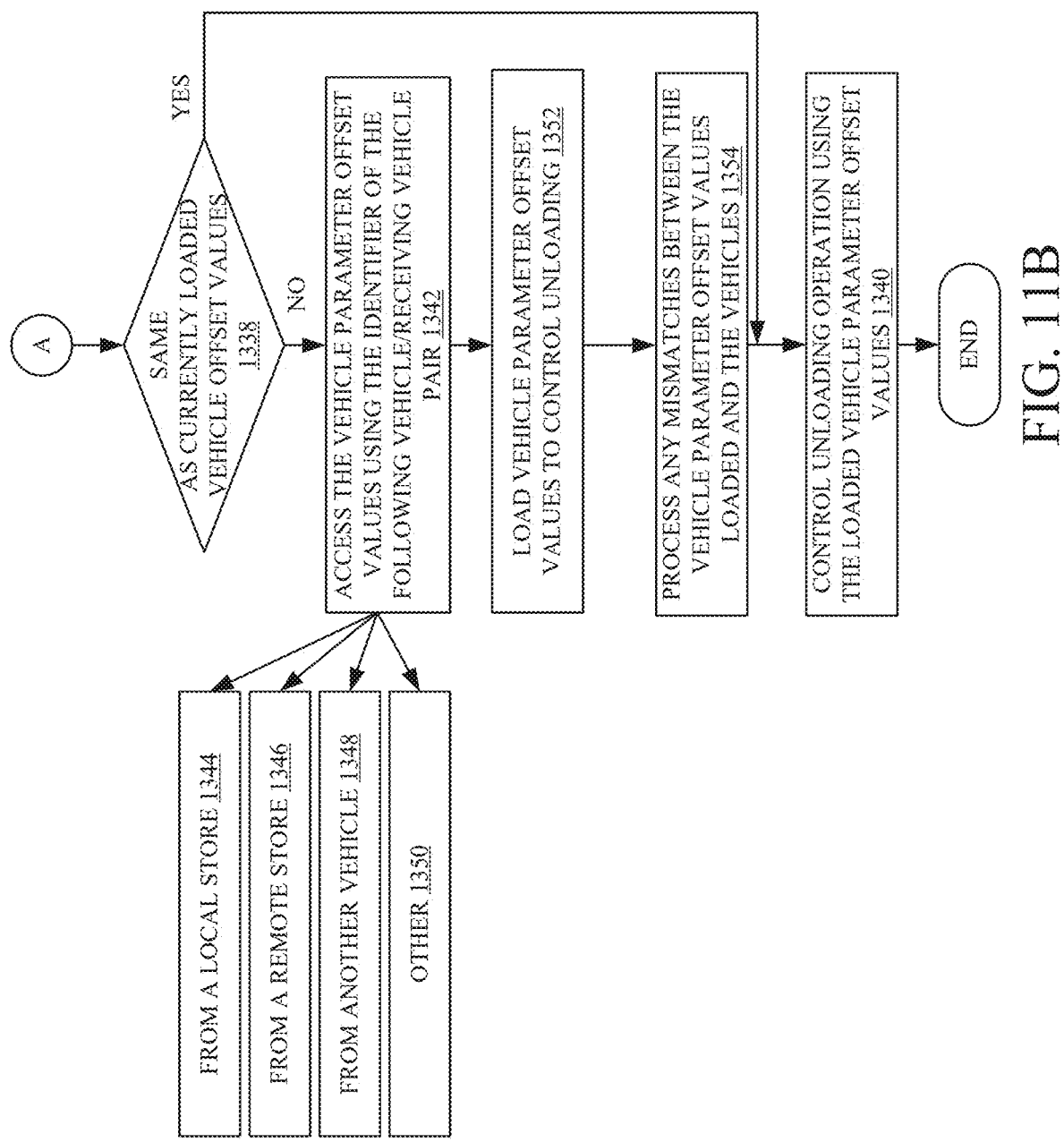

FIGS. 11A and 11B (collectively referred to as FIG. 11) show a flow diagram illustrating one example of the operation of offset value management system 161. It is first assumed that vehicle identification system 1282 obtains a vehicle identifier corresponding to the following vehicle 136/receiving vehicle 134 pair, as indicated by block 1291. The vehicle identifier can be for the vehicle pair or for one or both vehicles 136, 134 individually. The vehicle identifier can be input by an operator as indicated by block 1293, or automatically detected, as indicated by block 1295. The vehicle identifier can be received from the following vehicle 136, as indicated by block 1297 or in other ways, as indicated by block 1299.

The vehicle parameter offset values (which identify an offset between receiving vehicle parameter and a reference point on following vehicle 136) for the receiving vehicle and following vehicle are detected, for different vehicle parameters. Detecting the vehicle parameter offset values for the different vehicle parameters is indicated by block 1298 in the flow diagram of FIG. 11. In one example, the vehicle parameter offset values can be obtained by accessing dimension information 145 in data store 144, and calculating dimensional information indicative of the vehicle parameter offset values, as indicated by block 1300. In another example, a display screen can be generated on a user interface on the following vehicle 136 or leading vehicle 101, or both, for manual entry of the vehicle parameter offset values, as indicated by block 1302. In yet another example, the vehicle parameter offset values are obtained by calibration system 162 performing a calibration operation, as indicated by block 1304. In one example, the vehicle parameter offset values include one or more positions of reference locations on following vehicle 136, as indicated by block 1306 in the flow vehicle of FIG. 11, as well as the positions defining the receiving vessel on the receiving vehicle 134 (e.g., the positions of receiving vehicle parameters) relative to the reference locations on vehicle 136, as indicated by block 1308.

The machine or vehicle parameters for which offset values are obtained can be parameters for both the following vehicle 136 and/or the receiving vehicle 134. For instance, vehicle parameter offset values can be obtained for the location of the front wall, side walls, and rear wall of the receiving vehicle 134 relative to one or more different reference points on the following vehicle 136. The receiving vehicle parameter offset values and the following vehicle parameter offset values can be detected in other ways as well, as indicated by block 1310 in the flow diagram of FIG. 11.

The vehicle parameter offset values are received by vehicle parameter offset value receiving system 1270. System 1270 then interacts with data store interaction system 1272 to store the vehicle parameter offset values, values 147 in data store 144. In one example, the vehicle parameter offset values 147 are stored in a lookup table that is indexed by the vehicle identifier corresponding to this particular following vehicle 136/receiving vehicle 134 pair. One example of the vehicle identifier may include a unique identifier corresponding to the following vehicle 136 and/or receiving vehicle 134 (such as a VIN number, etc.). In another example, the lookup table may be indexed by vehicle model number (including the model numbers of one or both of the following vehicle 136 and receiving vehicle 134), by another vehicle identifier for the following vehicle 136 and/or receiving vehicle 134, or in other ways. Storing the receiving vehicle parameter offset values and following vehicle parameter offset values is indicated by block 1312 in the flow diagram of FIG. 11. Storing those values in a lookup table or in another data structure indexed by the vehicle identifier (e.g., VIN) in indicated by block 1314. Storing the vehicle parameter offset values by vehicle model identifiers is indicated by block 1316 in the flow diagram of FIG. 11. Storing the vehicle parameter offset values in a data structure that is accessible by using other following vehicle/receiving vehicle identifiers is indicated by block 1318 in the flow diagram of FIG. 11.

It should also be noted that the vehicle parameter offset values can be stored either on local data store 144, or on a remote data store. The remote data store may be a data store in a remote server environment (e.g., the cloud), a data store on a different vehicle, a data store at a farm manager computing system, a data store in a mobile device, or another data stores.

At some point, retrieval trigger detector 1274 detects a trigger indicating that the vehicle parameter offset values are to obtained for this particular following vehicle 136/receiving vehicle 134 pair. Detecting a trigger is indicated by block 1320 in the flow diagram of FIG. 11. The trigger may be based on an operator input 1322 provided by operator 194 or operator 208. For example, operator 208 may send a message through communication system 148 to receiving vehicle 101 identifying the VIN number or other vehicle identifier corresponding to vehicle 136 to indicate that an unloading operation is about to commence with respect to vehicle 136 and receiving vehicle 134. An operator input may also be provided by operator 194 indicating that the vehicle offset parameter values are to be obtained.

In another example, following vehicle 136 may automatically send a signal identifying itself to receiving vehicle 101 (and specifically to unloading control system 150). Having the following vehicle 136 automatically send a signal with a vehicle identifier is indicated by block 1324. Such a signal may be detected or interpreted by retrieval trigger detector 1274 as a trigger to obtain the vehicle parameter offset values for the following vehicle 136 and receiving vehicle 134.

In another example, unloading control system 150 may generate a signal to retrieval trigger detector 1274 indicating that an unloading operation is about to commence. This signal may also be a trigger to obtain the vehicle parameter offset values for the following vehicle 136/receiving vehicle 134 pair that is about to be loaded with material. Detecting a signal indicating that leading vehicle 101 is ready to unload signal is indicated by block 1326 in the flow diagram of FIG. 11. The trigger detector 1274 can detect a retrieval trigger based on other trigger criteria, or in other ways, as indicated by block 1328.

Vehicle identification system 1282 then obtains a vehicle identifier which identifies the following vehicle 136/receiving vehicle 134 pair, as indicated by block 1330 in the flow diagram of FIG. 11. Such a vehicle identifier may be sent from receiving vehicle 134 or from following vehicle 136 to leading vehicle 101, as indicated by block 1332. The vehicle identifier may be automatically recognized on the leading vehicle 101, as indicated by block 1334. For instance, following vehicle/receiving vehicle pair detector 160 may detect the identifiers of following vehicle 136 and receiving vehicle 134 using optical recognition that identifies optical features or other optical indicia that identify those vehicles. In another example, the vehicles 136 and 134, themselves, send vehicle identifiers (such as the VIN, model number, or other identifiers that identify those vehicles). The vehicle identifiers of the following vehicle 136/receiving vehicle 134 pair (or one or both of those vehicles individually) can be obtained in a wide variety of other ways as well, as indicated by block 1336 in the flow diagram of FIG. 11.

Current vehicle comparison system 1284 compares the vehicle identified by the vehicle identifier obtained at block 1330 to that of the following vehicle 136 and/or receiving vehicle 134 whose offset values are currently loaded into vehicle position detection system 164. If the two are the same, as determined at block 1338, then processing continues at block 1340. However, if, at block 1338, current vehicle comparison system 1284 determines that the vehicles identified by the vehicle identifier obtained at block 1330 are different than the vehicles for which the vehicle parameter offset values are currently loaded into vehicle position detection system 164, then data retrieval system 268 uses the vehicle identifier from block 1330 to access the correct vehicle parameter offset values as indicated by block 1342.

The vehicle parameter offset values 147 can be accessed from a local data store 144, as indicated by block 1344 in the flow diagram of FIG. 11. The vehicle parameter offset values can be accessed from a remote store, as indicated by block 1346, or from another vehicle, as indicated by block 1348. For instance, if a different leading vehicle (different from leading vehicle 101) performed a calibration operation to identify the calibrated offset values for this particular following vehicle 136/receiving vehicle 134 pair, then those calibrated offset values can be accessed from that other leading vehicle and used on leading vehicle 101. The vehicle parameter offset values can be accessed from other locations, or in other ways, as well, as indicated by block 1350 in the flow diagram of FIG. 11.

Once the vehicle parameter offset values have been obtained, then data retrieval system 268 loads those values into vehicle position detection system 164 for use in controlling the unloading operation. Loading the vehicle parameter offset values to control the unloading operation is indicated by block 1352 in the flow diagram of FIG. 11.

Mismatch processing system 1278 can also process any mismatches between the vehicle parameter offset values that are loaded into the vehicle position detection system 164 and those for the actual vehicles being loaded. Processing any mismatches is indicated by block 1354 in the flow diagram of FIG. 11. Processing the mismatches is described in greater detail below with respect to FIG. 12 as well.

Figure 12:
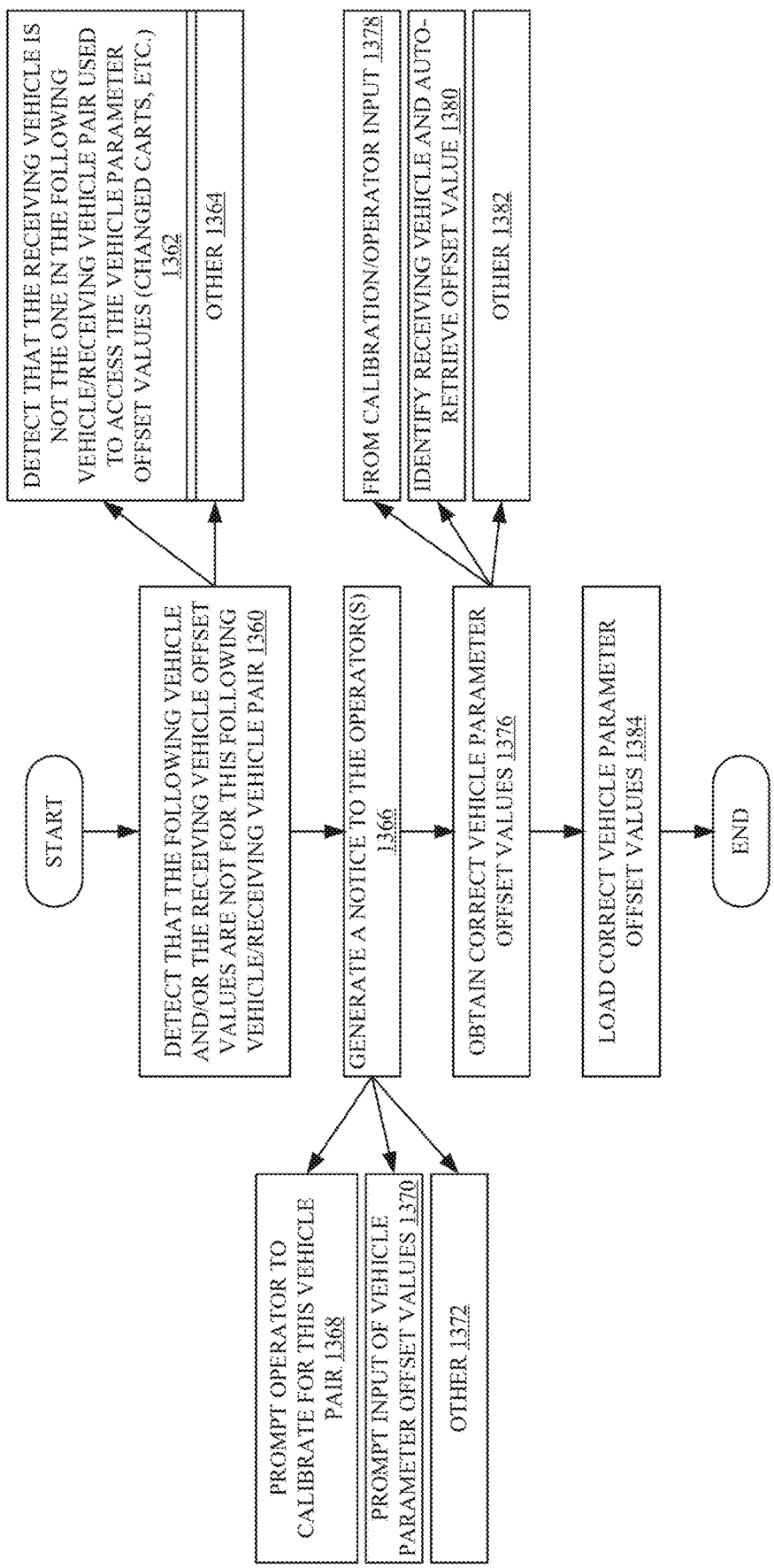
FIG. 12 is a flow diagram illustrating one example of the operation of a mismatch processing system.

FIG. 12 is a flow diagram illustrating one example of the operation of mismatch processing system 1278 in performing processing when the vehicle parameter offset values that have been loaded into vehicle position detection system 164 do not appear to correspond to the receiving vehicle 134 that is actually being loaded (or is about to be loaded). Mismatch identification system 1290 first detects that the vehicle parameter offset values for the following vehicle and/or the receiving vehicle are not for this particular following vehicle 136/receiving vehicle 134 pair. Detecting this mismatch is indicated by block 1360 in the flow diagram of FIG. 12.

For instance, it may be that system 1290 has detected that the receiving vehicle 134 is not the one in the following vehicle 136/receiving vehicle 134 pair that was used to access the vehicle parameter offset values, as indicated by block 1362. This may be the case, for instance, where the operator 208 has changed grain carts, etc. It may also be that one of the operators 194, 208 has provided an input indicating that there is a mismatch, or the mismatch may be detected in any of a variety of other ways, as indicated by block 1364 in the flow diagram of FIG. 12.

Operator interface interaction system 1292 then generates a notice to one or more of the operators 194 and/or 208, indicating that a mismatch has been detected. Generating the notice is indicated by block 1366 in the flow diagram of FIG. 12. The notice may prompt the operator to trigger calibration system 162 to perform a calibration operation for this particular following vehicle 136/receiving vehicle 134 pair, as indicated by block 1368. The notice may prompt the manual or automated input of the actual vehicle parameter offset values, as indicated by block 1370. For instance, the notice may provide a text entry field where one of the operators can input the vehicle parameter offset values, or the system 1292 can expose an interface that can be automatically called by control system 202 on vehicle 136 to automatically input the vehicle parameter offset values. The notice can be generated for the operators in a wide variety of other ways as well, as indicated by block 1372.

Retrieval control system 1294 then obtains the correct vehicle parameter offset values, as indicated by block 1376 in the flow diagram of FIG. 12. For instance, the vehicle parameter offset values can be received (as calibrated offset values) from calibration system 162 or through an operator input, as indicated by block 1378. The vehicle parameter offset values can be obtained by identifying the correct following vehicle 136/receiving vehicle 134 pair and automatically retrieving the vehicle parameter offset values from data store 144 or elsewhere, as indicated by block 1380 in the flow diagram of FIG. 12. Retrieval control system 1294 can obtain the correct vehicle parameter offset values in any of a wide variety of other ways as well, as indicated by block 1382.

Mismatch processing system 1278 generates an output indicative of the correct vehicle parameter offset values so that those values can be loaded into vehicle position detection system 164 for use in controlling the unloading operation, as indicated by block 1384 in the flow diagram of FIG. 12.

It can thus be seen that the present description proceeds with respect to a system that automatically stores the vehicle parameter offset values corresponding to a following vehicle 136/receiving vehicle 134 pair so that the values can be automatically retrieved and used in controlling an unloading operation when the leading vehicle 101 encounters that following vehicle 136/receiving vehicle 134 pair in the future. The vehicle parameter offset values can be stored in a lookup table or in another data structure that is indexed by a vehicle identifier that identifies the following vehicle 136/receiving vehicle 134 pair or one or both of those vehicle individually. The vehicle identifier may be, for instance, the VIN of the following vehicle 136 and/or of the receiving vehicle 134. The vehicle identifier may be a model number of one or both of the vehicles, an optical identifier, or another type of identifier that identifies the following vehicle 136/receiving vehicle 134 pair or one or both of the vehicles individually, corresponding to the set of vehicle parameter offset values. The vehicle parameter offset values can be stored locally on one of the machines, remotely in a remote server environment, or on a different system. The vehicle parameter offset values can be stored on a mobile device, or on a different vehicle where they can be accessed at a later time.

When a mismatch is identified, in which the following vehicle 136/receiving vehicle 134 pair does not match that corresponding to the vehicle parameter offset values that are currently being used to control the unloading operation, then a notification can be generated for one or more of the operators, and operations can be performed to obtain the correct set of vehicle parameter offset values. The correct set of vehicle parameter offset values is then loaded into the vehicle position detection system for use in controlling the unloading operation.

It can thus be seen that the present description has also described a system which performs a calibration operation that can be used to locate different receiving vehicle parameters relative to a reference point on a following vehicle. This calibrated offset values can then be stored and used in locating the receiving vehicle during subsequent unloading operations so that the receiving vehicle need not be located using visual image capture and image processing, which can be error prone. This increases the accuracy of the unloading operation.

As mentioned above, in one example, the location of the hitch point 137 (hitch point location) on following vehicle 136 can be identified relative to the location of the position sensor (e.g., the GPS receiver) 196 on following vehicle 136. Also, the hitch point location and the route of following vehicle 136 and position of vehicle 136 relative to leading vehicle 101 can be applied to a dynamic model that models the kinematics of receiving vehicle 134. For instance, the dynamic model may model how receiving vehicle 134 moves as the pivot point or hitch point 137 to which it is coupled moves along the route of following vehicle 136. As an example, if following vehicle 136 turns, vehicle 136 pivots about hitch point 137. However, receiving vehicle 134 will eventually also turn to follow the same heading as following vehicle 136. The dynamic model models the motion of various points (e.g., the receiving vehicle parameters or other points) on receiving vehicle 134 through space, based upon the location of pivot point 137 and the route of the following vehicle 136. In such an example, once the calibrated offset value is known which indicates the location of hitch point 137 relative to the position sensor 196 on following vehicle 136, and once the route of following vehicle 136 is known, then the dynamic model can be used to compute the location of receiving vehicle 134 relative to the position sensor 196 or hitch point 137 or other known reference value on following vehicle 136. The location of receiving vehicle 134, relative leading vehicle 101, can thus be determined as well.

Figure 13A:
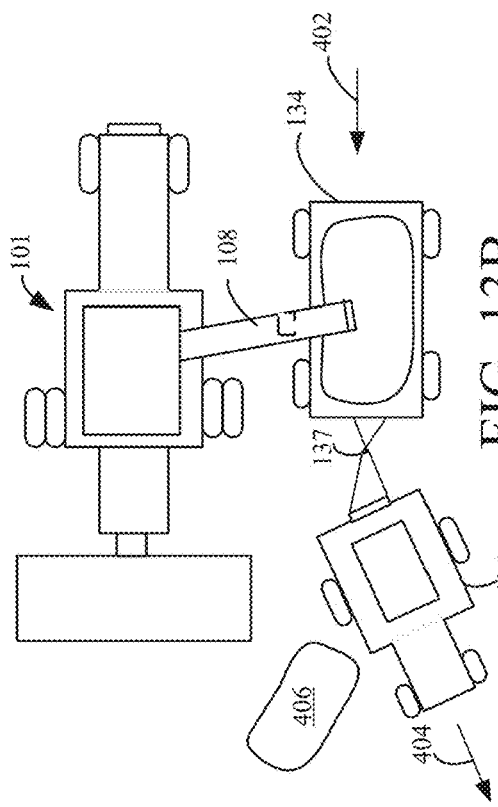
Figure 13B:
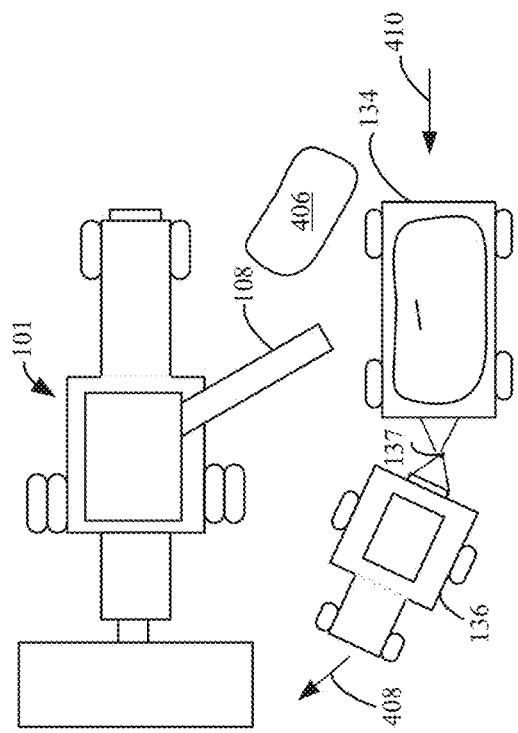

FIGS. 13A-13E show examples of how the movement of receiving vehicle 134 changes based upon the position and heading or route of following vehicle 136. In FIG. 13A, for instance, it can see that vehicle 136 is moving in a forward direction along a route generally indicated by arrow 400, and it can be seen that following vehicle 136 and receiving vehicle 134 have just recently traveled along a route indicated by arrow 402. FIG. 13B, however, shows that following vehicle 136 has now turned to follow a route indicated by arrow 404, in order to avoid an obstacle 406, but receiving vehicle 134 is still traveling as shown by arrow 402.

Figure 13C:
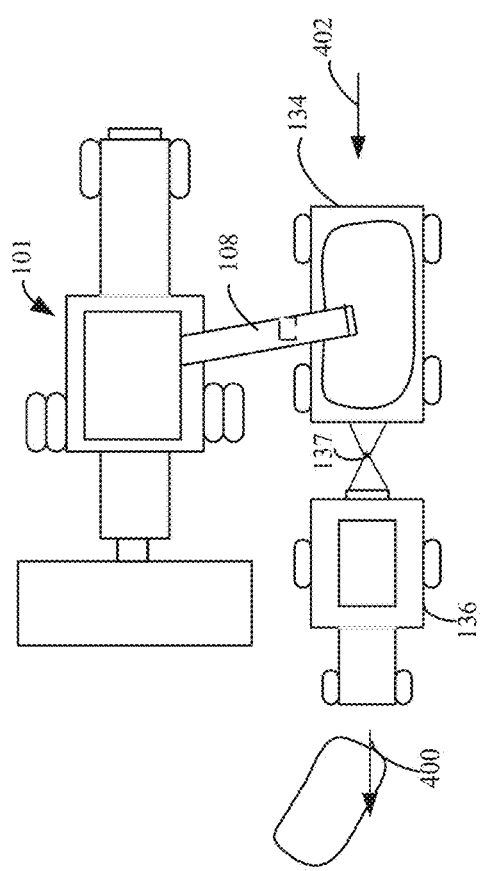
Figure 13D:
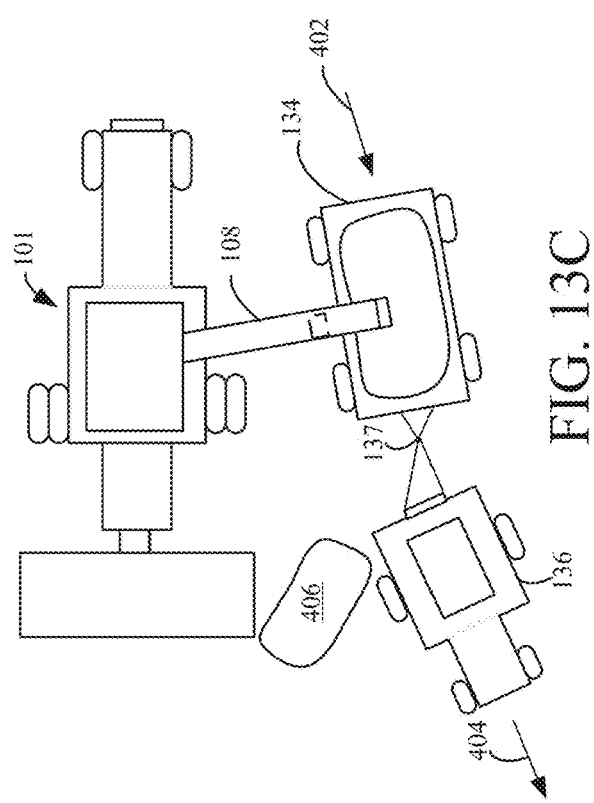

Eventually, because pivot point 137 will move with following vehicle 136, the receiving vehicle 134 will also turn to follow following vehicle 136, as illustrated in FIG. 13C. FIG. 13D shows that following vehicle 136 is now moving in a direction indicated by arrow 408. Receiving vehicle 134 is traveling along a different route indicated by arrow 410, but will soon turn to follow following vehicle 136, as shown in FIG. 13E. This type of movement of receiving vehicle 134 can be modeled by a dynamic model which models the kinematics of receiving vehicle 134 as the hitch point 137 moves through space (e.g., as hitch point 137 moves to follow the route taken by following vehicle 136). The dynamic model may be a machine learned kinematic model that automatically learns the kinematics of receiving vehicle 134, or a model that receives data indicative of the dimensions and movement characteristics of receiving vehicle 134. It can be seen in FIGS. 13A-13E that, by knowing the location of hitch point 137 relative to leading vehicle 101 (e.g., by knowing the offset of hitch point 137 from the position sensor 196 on following vehicle 136 and by knowing the relative position of the position sensor 196 relative to the position sensor on leading vehicle 101), and by knowing the route that following vehicle 136 is following, then the dynamic model can estimate the position of receiving vehicle 134 relative to hitch point 137, or relative to the position sensor 196 on receiving vehicle 136, and/or relative to the position of leading vehicle 101 and/or relative to a subsystem on leading vehicle 101.

Therefore, vehicle position detection system 164 on leading vehicle 101 simply needs to obtain the location of position sensor 196 on following vehicle 136 as well as the route of following vehicle 136 and the offset of hitch point 137 relative to position sensor 196. From that information, and using a dynamic model, vehicle position detection system 164 can detect the position of receiving vehicle 134 relative to spout 108 on leading vehicle 101. Such information can be used to control the unloading operation (e.g., to position spout 108, to position vehicles 136 and 101 relative to one another, to turn on and off the material conveyance subsystem 186 on leading vehicle 101, etc.).

Figure 14:
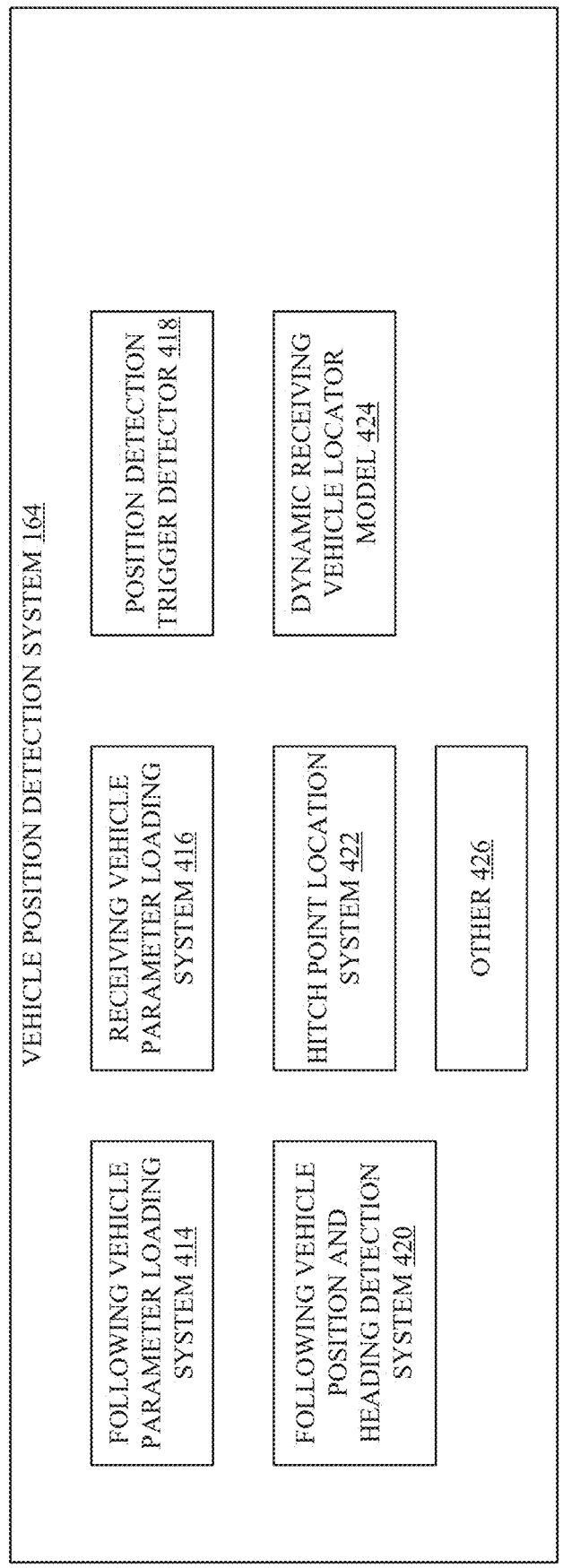
FIG. 14 is a block diagram showing one example of a vehicle position detection system.

FIG. 14 is a block diagram showing one example of vehicle position detection system 164, in more detail. In the example shown in FIG. 14, vehicle position detection system 164 includes following vehicle parameter loading system 414, receiving vehicle parameter loading system 416, position detection trigger detector 418, following vehicle position and heading detection system 420, hitch point location system 422, dynamic receiving vehicle locator model 424, and other items 426.

Following vehicle parameter loading system 414 can obtain parameters, such as dimensions, calibrated offset values, etc., with respect to following vehicle 136. The parameter information may include such things as the offset between hitch point 137 and the position sensor 196 on following vehicle 136, and/or other dimension information or kinematic information. Receiving vehicle parameter loading system 416 receives or otherwise obtains access to parameters of receiving vehicle 134, such as calibrated offset values, kinematic information, dimensional information, and/or other parameter values. Systems 414 and 416 can obtain the information from following vehicle 136 and/or receiving vehicle 134, from data store 144, from another remote system or another vehicle, etc. Also, the information can be retrieved based upon a vehicle identifier or another identifier that identifies receiving vehicle 134 and/or following vehicle 136, or the pair comprising following vehicle 136 and receiving vehicle 134.

Position detection trigger detector 418 detects trigger criteria indicating when the position or location of receiving vehicle 134 is to be detected. For instance, when trigger detector 418 detects that the following vehicle 136/receiving vehicle 134 pair is in position for leading vehicle 101 to begin an unloading operation, this may trigger detector 418 to detect the position of receiving vehicle 136. The detection may be continuous or intermittent, so long as the unloading operation is being performed, or the trigger criteria can be other criteria or the criteria can be detected in other ways.

Following vehicle position and heading detection system 420 detects the position and heading of following vehicle 136. The position and heading can be in absolute terms, or relative to the position and/or heading of leading vehicle 101. For instance, it may be that system 420 controls communication system 148 to obtain the current position and heading of following vehicle 136 from position sensor 196. In another example, the position and heading of following vehicle 136 can be detected using sensors 152 or other sensors on leading vehicle 101. In another example, system 420 can obtain multiple position indicators from position sensor 196 and calculate the heading of following vehicle 136 based upon the multiple position indicators. System 420 can obtain the position and heading or route of following vehicle 136 in other ways as well.

Hitch point location system 422 can be used to locate the hitch point 137 relative to leading vehicle 101. For instance, once the position of position sensor 196 on following vehicle 136 is known, and once the offset between sensor 196 and hitch point 137 is known, hitch point location system 422 can identify the location of hitch point 137 relative to position sensor 196 on following vehicle 136. Then, obtaining the position of leading vehicle 101 from position sensor 146, hitch point location system 422 can locate the hitch point 137 relative to the position sensor 146 on leading vehicle 101, and relative to any other items on leading vehicle 101 (given that the offset between those items and position sensor 146 is known).

Dynamic receiving vehicle locator model 424 is illustratively a machine learned dynamic model that receives, as an input, the location of hitch point 137 and the route of following vehicle 136 and/or receiving vehicle 134 and calculates the position of receiving vehicle 134 relative to the hitch point 137, relative to following vehicle 136, and/or relative to vehicle 101 (or any subsystem or reference point on vehicle 101). In this way, system 164 can calculate the location of receiving vehicle 134 relative to spout 108 (or other known items on leading vehicle 101) and can use that information to control the unloading operation (such as to turn on or off the material conveyance subsystem 186, to control the position or orientation of material conveyance subsystem 186, to control the relative position of vehicles 101 and 136 or 134 relative to one another, etc.).

Figure 15A:
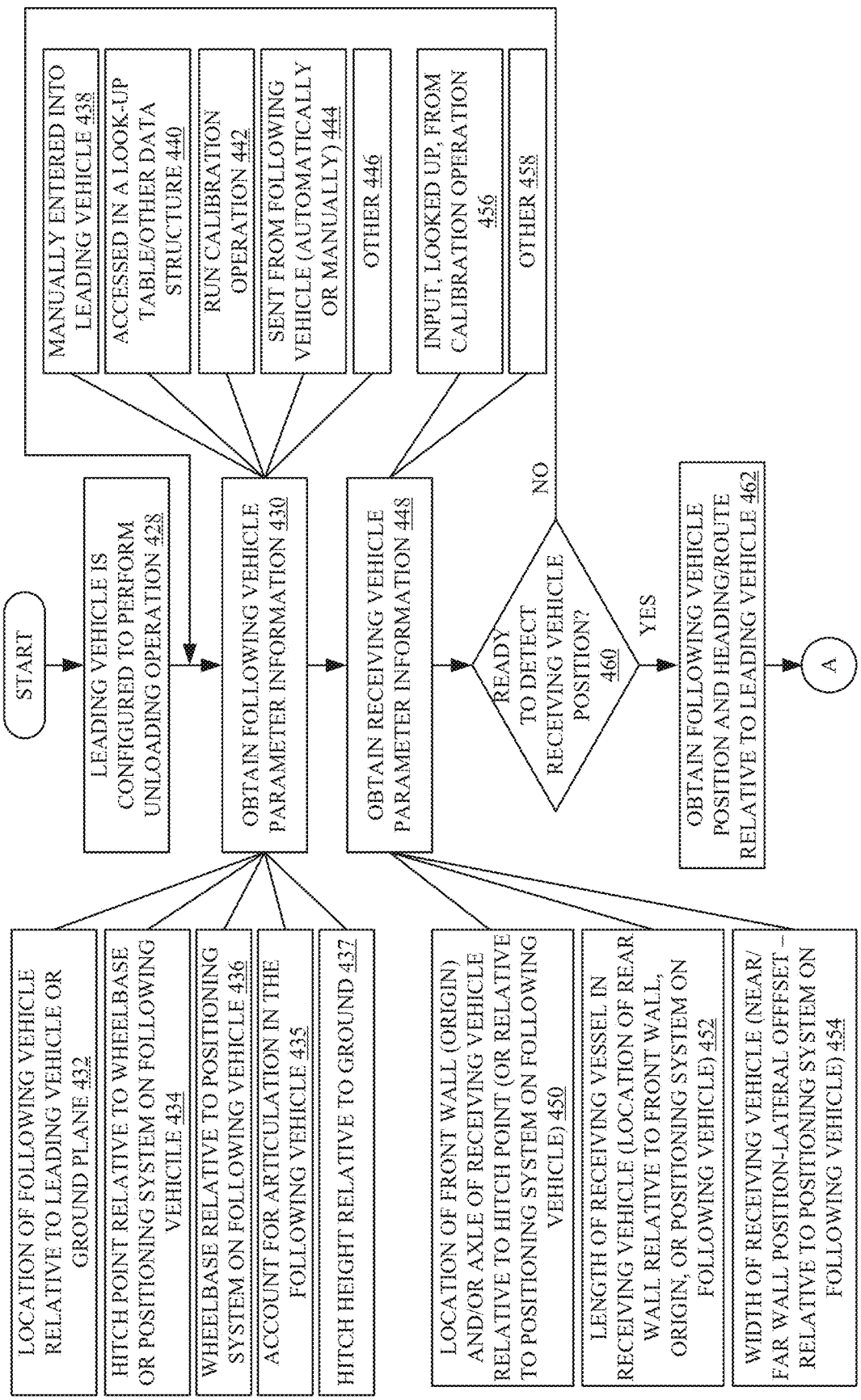
FIGS. 15A and 15B (collectively referred to as FIG. 15) show a flow diagram illustrating one example of the operation of the vehicle position detection system.
Figure 15B:
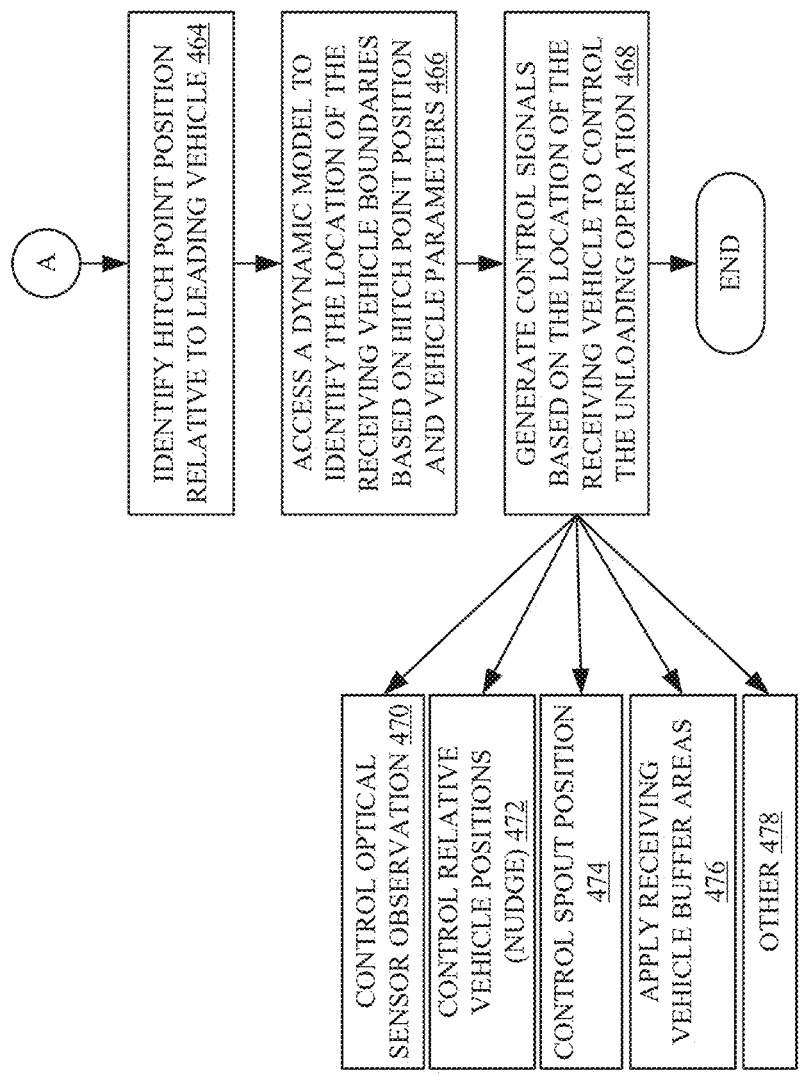

FIGS. 15A and 15B (collectively referred to herein as FIG. 15) show a flow diagram illustrating one example of the operation of vehicle position detection system 164 in using a dynamic model 424 along with the location of hitch point 137 and route of vehicle 136 and/or vehicle 134 to identify the position of receiving vehicle 134 relative to leading vehicle 101. It is first assumed that leading vehicle 101 is configured to perform an unloading operation to unload material into receiving vehicle 134, as indicated by block 428 in the flow diagram of FIG. 15. Following vehicle parameter loading system 414 then obtains the following vehicle parameter information, as indicated by block 430. The following vehicle parameter information can include the location of following vehicle 136 relative to leading vehicle 101, or relative to a ground plane, as indicated by block 432. The following vehicle parameter information can include the location of hitch point 137 relative to the wheelbase or position sensor 196 on following vehicle 136, as indicated by block 434. The following vehicle parameter information can include the location of the wheelbase of following vehicle 136 relative to the position sensor 196 on following vehicle 136, as indicated by block 436. The following vehicle parameter information can account for the articulation angle when the following vehicle is an articulated vehicle, such as an articulated tractor. The articulation angle can be sensed and a fixed transform, a lookup table, or another technique can be used to identify or calculate the pose of the following vehicle 136 and the receiving vehicle 134, as indicated by block 435. In addition, the following vehicle parameter information can include the height of the hitch above the ground, as indicated by block 437. The following vehicle parameter information can be manually entered into the leading vehicle 101, through a user interface, as indicated by block 438, or it can be accessed in a lookup table or other data structure (e.g., in data store 144) that may be indexed based on vehicle type, vehicle identifier, etc., as indicated by block 440 in the flow diagram of FIG. 15. The following vehicle parameter information can be obtained by running the calibration operation discussed above, as indicated by block 442, or the following vehicle parameter information can be sent from following vehicle 136 (where it may be sent manually or automatically) as indicated by block 444. The following vehicle parameter information can include other types of information and it can be obtained in other ways as well, as indicated by block 446.

Receiving vehicle parameter loading system 416 then obtains the receiving vehicle parameter information, as indicated by block 448 in the flow diagram of FIG. 15. The receiving vehicle parameter information can include such things as the location of the front wall (or origin) and/or axle of the receiving vehicle 134 relative to hitch point 137 (or relative to the position sensor 196) on following vehicle 136, as indicated by block 450. The receiving vehicle parameter information can include dimension information such as the length of the receiving vehicle (or the receiving vessel in the receiving vehicle) 134, or the location of the rear wall relative to the front wall or origin, or relative to the positioning sensor 196 on following vehicle 146, or other information, as indicated by block 452 in the flow diagram of FIG. 15. The receiving vehicle parameter information can include the width of the receiving vehicle (e.g., the distance from the near wall to the far wall—or lateral offset of the two walls) or the distance to the near and/or far walls from the position sensor 196 on the following vehicle 136. Obtaining information indicative of the width of the receiving vehicle 134 is indicated by block 454 in the flow diagram of FIG. 15. The receiving vehicle parameter information can be manually input, automatically input, looked up in a data store, or obtained by performing the calibration operation, discussed above, as indicated by block 456 in the flow diagram of FIG. 15. The receiving vehicle parameter information can be obtained in other ways as well, as indicated by block 458.

Position detection trigger detector 418 then detects whether it is time to detect the position of receiving vehicle 134, as indicated by block 460 in the flow diagram of FIG. 15. As discussed above, the trigger criteria may be based on the fact that following vehicle 136 and receiving vehicle 134 are in position for leading vehicle 101 to commence an unloading operation. The trigger criteria may be that the unloading operation has commenced, or the trigger criteria may be an operator input or automated input from following vehicle 136 (that is detected on leading vehicle 101), an operator input or automated input on leading vehicle 101, or other trigger criteria. If the trigger criteria are not yet met, then processing reverts to block 430 where the following vehicle parameter information and receiving vehicle parameter information can be obtained (in case a different following vehicle 136 and receiving vehicle 134 pair have been encountered by leading vehicle 101).

However, once the trigger criteria are met, then following vehicle position and heading detection system 420 detects or calculates the following vehicle position and the heading or route of the following vehicle 136 relative to leading vehicle 101, as indicated by block 462 in the flow diagram of FIG. 15. The following vehicle heading or route and position can be communicated from following vehicle 136 to detection system 420 automatically or manually or the following vehicle position and route can be detected using one or more of the sensors 152 or in other ways.

Hitch point location system 422 then identifies the location of hitch point 137 relative to the leading vehicle 101, as indicated by block 464 in the flow diagram of FIG. 15. Again, the location of the hitch point 137 can be identified based upon the location of position sensor 196 on following vehicle 136 relative to leading vehicle 101, and based on the offset between the position sensor 196 and hitch point 137. The location of the hitch point 137 relative to leading vehicle 101 can be identified or detected in other ways as well.

Vehicle position detection system 164 then uses dynamic receiving vehicle locator model 424 to identify the location of the receiving vehicle boundaries (the walls of receiving vehicle 134 or the center point of receiving vehicle 134) or to otherwise locate receiving vehicle 134. Receiving vehicle 134 is located based upon the location of the hitch point 137, the route of following vehicle 136, and/or any other desired vehicle parameters (either following vehicle parameters or receiving vehicle parameters) as indicated by block 466 in the flow diagram of FIG. 15. Dynamic model 424 can model the kinematics of receiving vehicle 134 given the location of hitch point 137 and the route of the vehicles. Model 424 can be a machine learned model, or an artificial intelligence (AI) model, or another model.

Vehicle position detection system 164 outputs the location of receiving vehicle 136 relative to leading vehicle 101 to control signal generator 166. Control signal generator 166 then generates control signals based upon the location of the receiving vehicle 134, in order to control the unloading operation, as indicated by block 468 in the flow diagram of FIG. 15. In one example, control signal generator 166 generates control signals to control optical sensor positioning subsystem 191. System 191 can be actuated to point or aim camera 106 based on the location of receiving vehicle 134 relative to leading vehicle 101. For example, when optical sensor 169 is being used to observe the fill profile in receiving vehicle 136, or to observe other items, then optical sensor positioning system 191 can be controlled so that the field of view of sensor 169 obtains a best or satisfactory view of the fill level in receiving vehicle 134. Controlling the position of optical sensor 106 based upon the location of the receiving vehicle 134 relative to the leading vehicle 101 is indicated by block 470 in the flow diagram of FIG. 15.

Control signal generator 166 can generate control signals to control the propulsion subsystem 188 and steering subsystem 190 on leading vehicle 101 and/or the propulsion subsystem and steering subsystem on following vehicle 136. Control signal generator 166 can generate other control signals to control the relative vehicle positions (such as to nudge one forward or backward relative to the other) as indicated by block 472 in the flow diagram of FIG. 15. In another example, control signal generator 166 can generate control signals to control material conveyance subsystem 186 (such as to turn on and off the blower, auger, etc.), to position the spout and/or flap, etc. as indicated by block 474 in the flow diagram of FIG. 15.

Also, some control algorithms calculate buffer zones proximate the edges (or walls) of the receiving vehicle 134 so that the filling operation does not fill material in those zones in order to avoid inadvertent spillage of material over the side of receiving vehicle 134. Thus, the location of the receiving vehicle 134 relative to leading vehicle 101 can be used to define the buffer zones in performing the unloading operation. Calculating and using buffer zones or buffer areas on receiving vehicle 134 is indicated by block 476 in the flow diagram of FIG. 15. Control signal generator 166 can generate any of a wide variety of other control signals to control other operations or subsystems in order to control the unloading operation, as indicated by block 478 in the flow diagram of FIG. 15.

It can thus be seen that the present description describes a system that models the kinematics of a receiving vehicle based on the location of the hitch point and the heading of the following vehicle relative to the leading vehicle. The heading and position of the following vehicle can be communicated to the leading vehicle so that the dynamic model can locate the receiving vehicle relative to the leading vehicle without needing to rely on images captured by an optical sensor. This improves the accuracy and robustness of the location and control systems.

Figure 16:
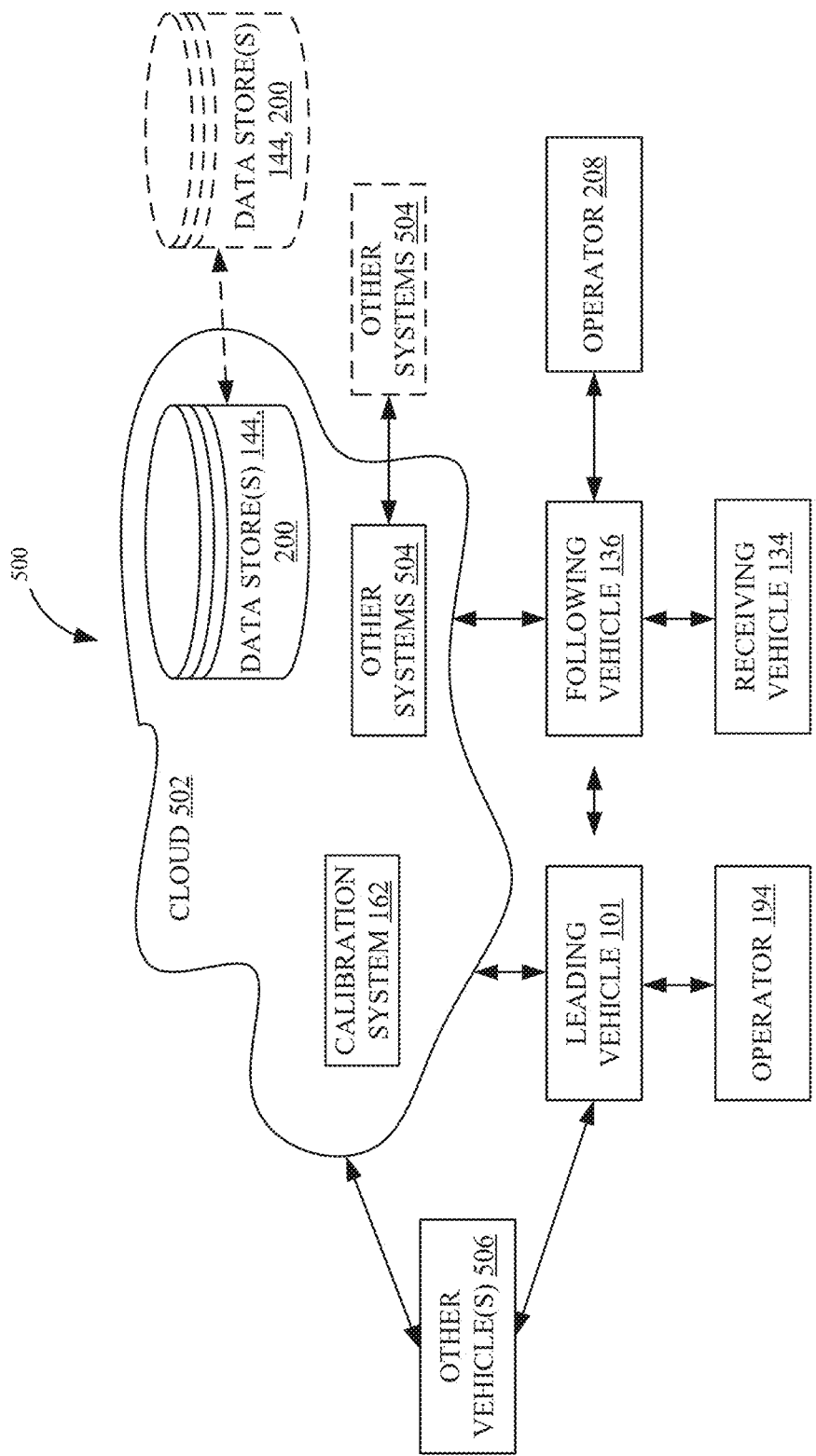
FIG. 16 is a block diagram showing one example of a harvesting machine deployed in a remote server architecture.

FIG. 16 is a block diagram illustrating agricultural machine 140, shown in FIG. 4, except that system 140 is disposed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 16, some items are similar to those shown in FIG. 4 and they are similarly numbered. FIG. 7 specifically shows that data stores 144, 200, calibration system 162, and other systems 504, can be located at a remote server location 502. Therefore, vehicles 101, 136 can access those systems through remote server location 502.

FIG. 16 also depicts another example of a remote server architecture. FIG. 16 shows that it is also contemplated that some elements of FIG. 4 can be disposed at remote server location 502 while others are not. By way of example, one or more of data stores 144, 200 and other systems 504, or other items can be disposed at a location separate from location 502, and accessed through the remote server at location 502. Regardless of where the items are located, the items can be accessed either directly by machine 101 and/or machine 136, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. All of these architectures are contemplated herein.

FIG. 16 shows that other vehicles 506 can communicate with one or more vehicles 101, 136, or with remote server environment 502 to obtain the calibrated offset values and/or other information. It will also be noted that the elements of FIG. 4, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 17:
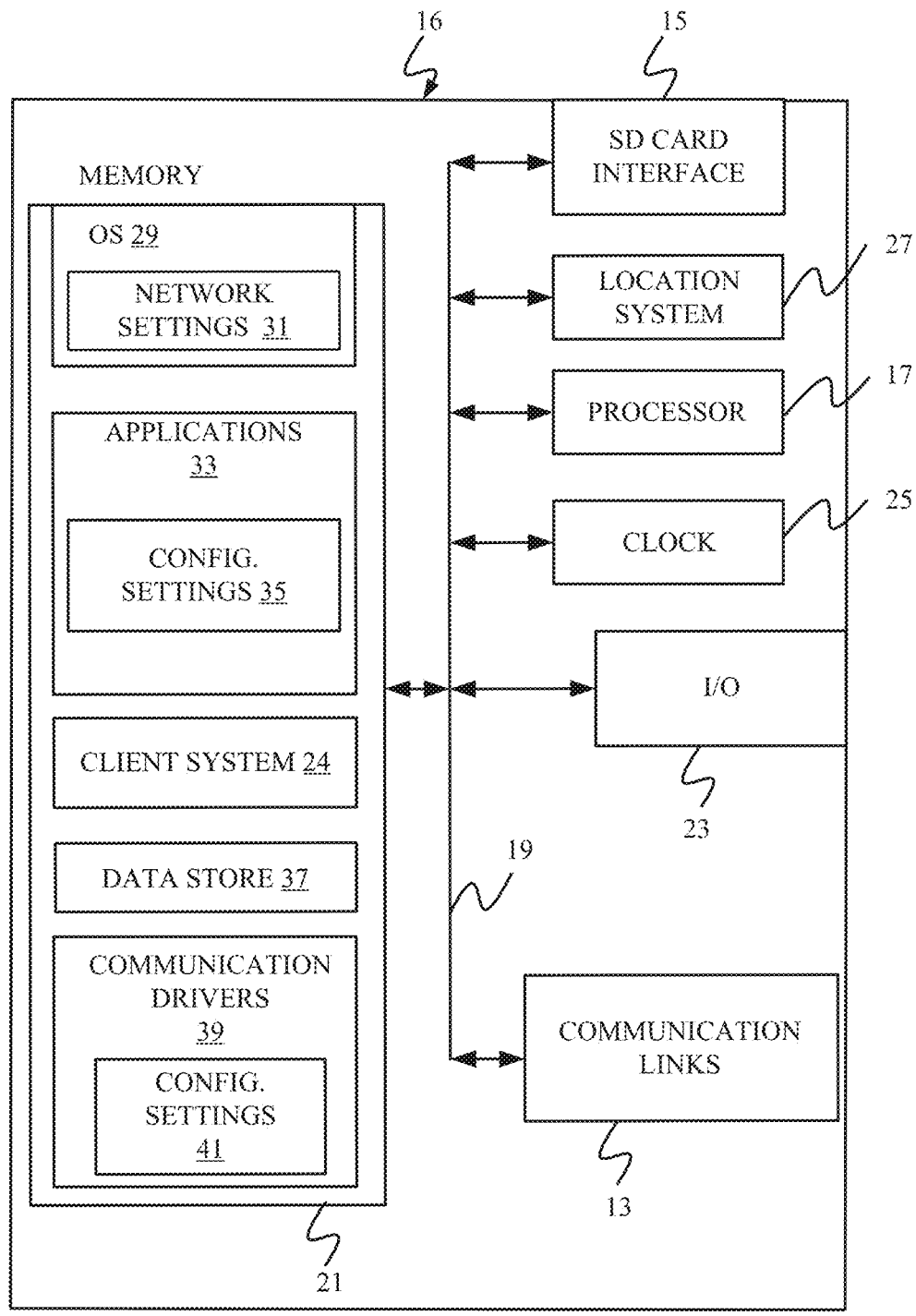
FIGS. 17-19 show examples of mobile devices that can be used in the machines and systems described in other figures.
Figure 18:
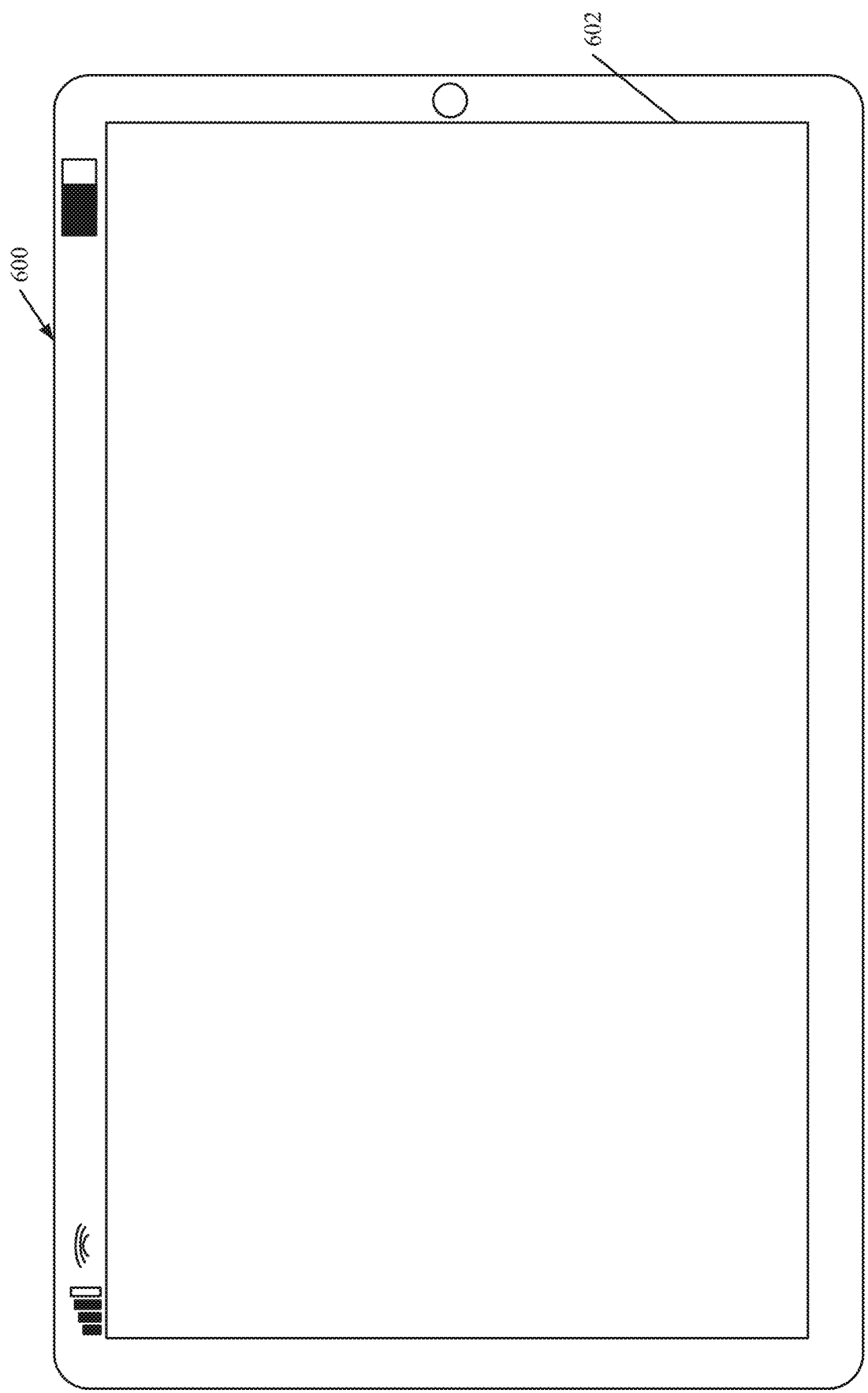
Figure 19:
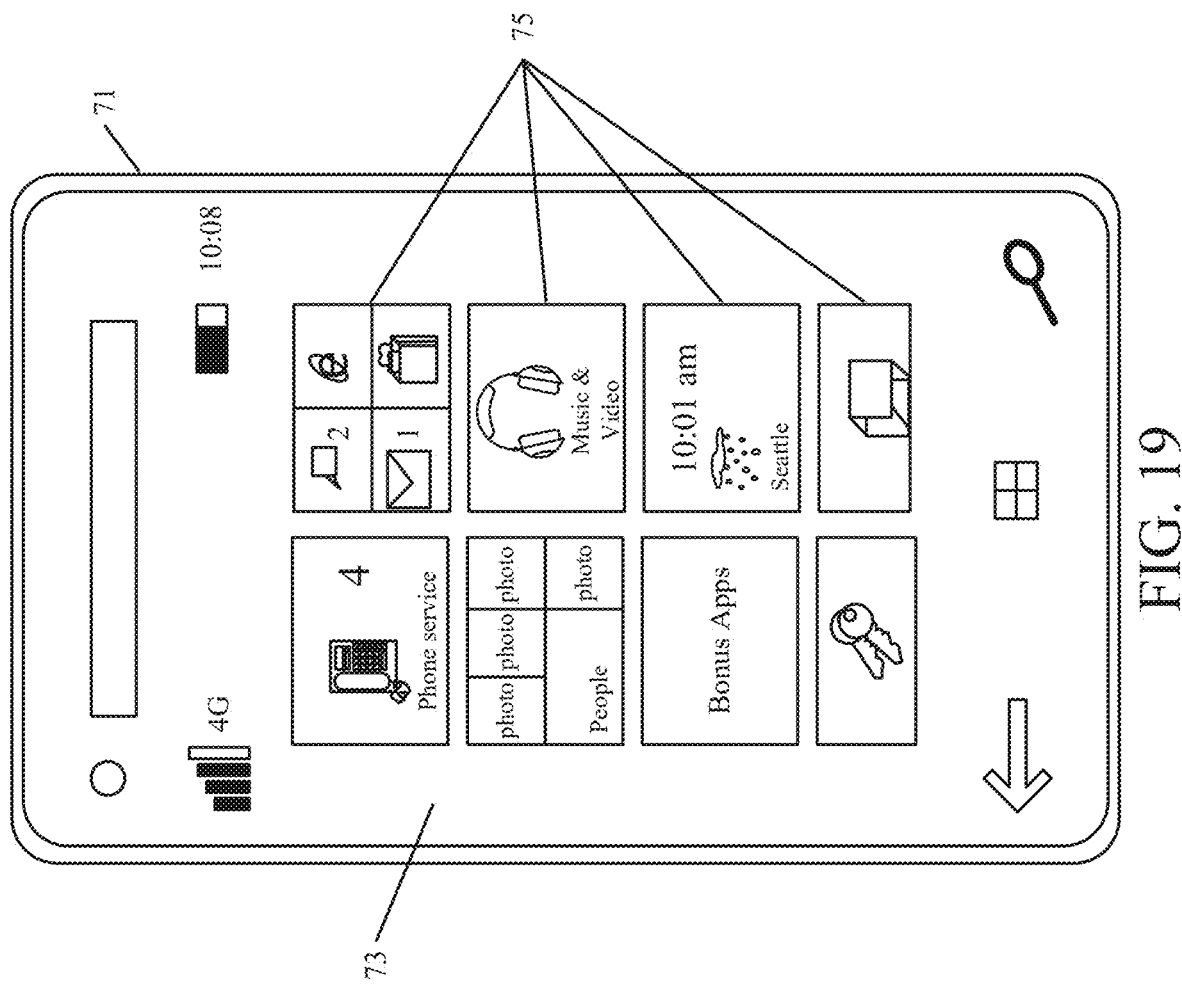

FIG. 17 is a simplified block diagram of one illustrative example of a handheld or mobile computing device that can be used as a user's or client's hand held device 16, in which the present system (or parts of it) can be deployed. For instance, a mobile device can be deployed in the operator compartment of one or both of vehicles 101, 136 for use in generating, processing, or displaying the calibrated offset values. FIGS. 18-19 are examples of handheld or mobile devices.

FIG. 17 provides a general block diagram of the components of a client device 16 that can run some components shown in FIG. 4, that interacts with them, or both. In the device 16, a communications link 13 is provided that allows the handheld device to communicate with other computing devices and in some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, client system 24, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 18 shows one example in which device 16 is a tablet computer 600. In FIG. 18, computer 600 is shown with user interface display screen 602. Screen 602 can be a touch screen or a pen-enabled interface that receives inputs from a pen or stylus. Tablet computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 19 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 20:
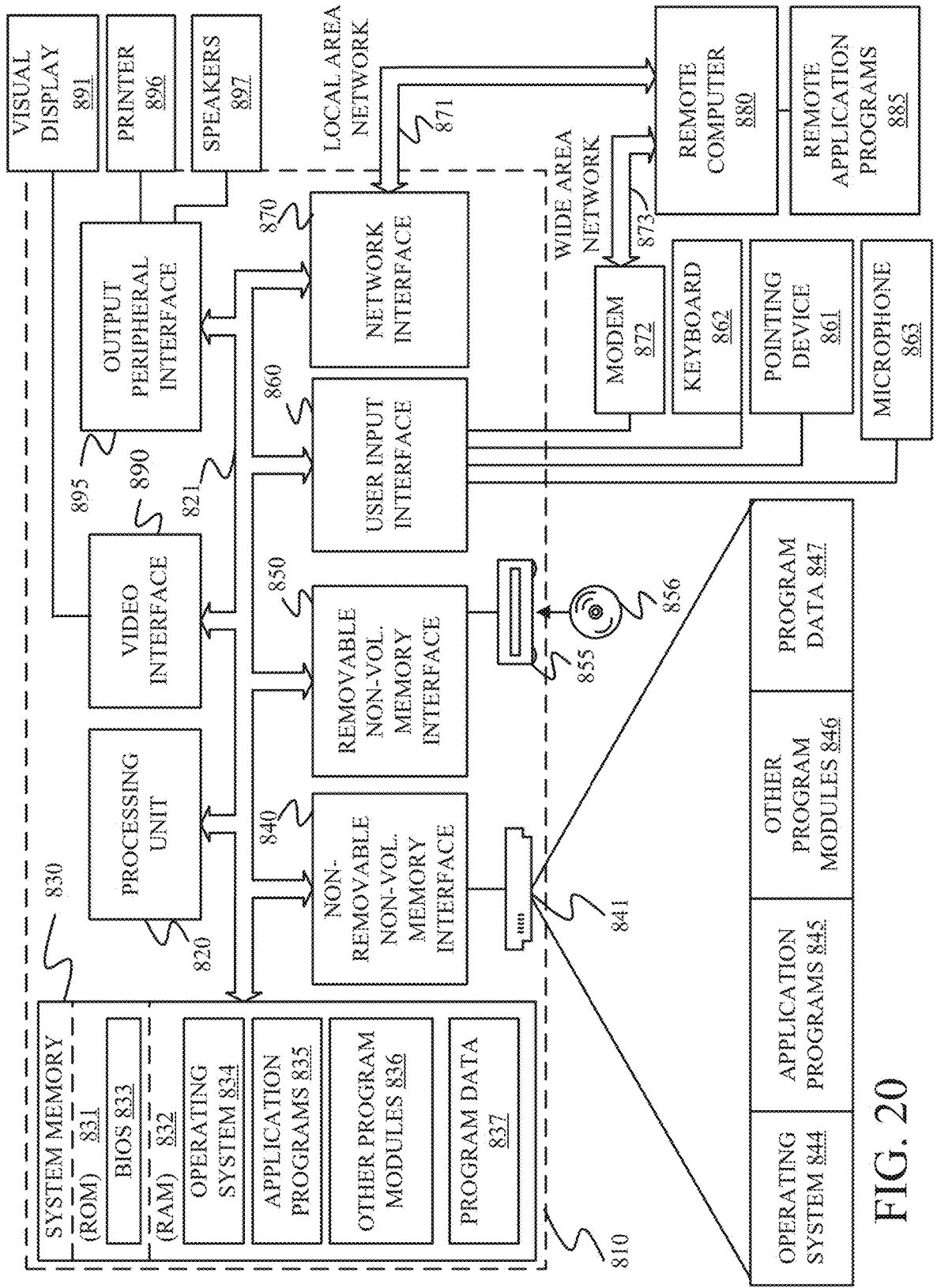
FIG. 20 is a block diagram showing one example of a computing environment that can be used in the machines and systems described with respect to previous figures.

FIG. 20 is one example of a computing environment in which elements of FIG. 4, or parts of it, (for example) can be deployed. With reference to FIG. 20, an example system for implementing some embodiments includes a computing device in the form of a computer 810 programmed to operate as discussed above. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 4 can be deployed in corresponding portions of FIG. 20.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 20 illustrates operating system 834, application programs 835, other program modules 836, and program data 837.

The computer 810 may also include other removable/non-removable volatile/nonvolatile computer storage media. By way of example only, FIG. 20 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 20, provide storage of computer readable instructions, data structures, program modules and other data for the computer 810. In FIG. 20, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of controlling an unloading operation for unloading material from a leading vehicle to a receiving vehicle that is propelled by a following vehicle, the method comprising:
    detecting a hitch point location indicative of a relative location of a hitch point relative to the leading vehicle, wherein the receiving vehicle is coupled to the following vehicle at the hitch point;
    identifying a route of the following vehicle;
    determining, with a dynamic model, a location of the receiving vehicle relative to the leading vehicle based on the route of the following vehicle and based on the hitch point location indicative of the relative location of the hitch point relative to the leading vehicle; and
    controlling the unloading operation based on the location of the receiving vehicle relative to the leading vehicle.

2. The computer implemented method of claim 1 wherein detecting the hitch point location comprises:
    obtaining a following vehicle parameter indicative of an offset from a position sensor on the following vehicle to the hitch point;
    detecting a relative vehicle position indicative of a position of the position sensor on the following vehicle relative to a position of a position sensor on the leading vehicle; and
    detecting the hitch point location relative to the leading vehicle based on the following vehicle parameter and the relative vehicle position.

3. The computer implemented method of claim 1 wherein determining, with a dynamic model, a location of the receiving vehicle relative to the leading vehicle comprises:
    determining a location of the receiving vehicle relative to a portion of a material conveyance subsystem on the leading vehicle.

4. The computer implemented method of claim 3 wherein determining a location of the receiving vehicle relative to the leading vehicle comprises:
    determining a length of receiving vehicle.

5. The computer implemented method of claim 1 wherein the dynamic model comprises a machine learned model and wherein determining, with the dynamic model, the location of the receiving vehicle relative to the leading vehicle comprises:
    accessing the machine learned model based on the hitch point location and the route of the following vehicle.

6. The computer implemented method of claim 1 wherein the dynamic model comprises a kinematic model that models kinematics corresponding to the receiving vehicle and wherein determining, with the dynamic model, the location of the receiving vehicle relative to the leading vehicle comprises:
   accessing the kinematic model based on the hitch point location and the route of the following vehicle.

7. The computer implemented method of claim 1 wherein the leading vehicle comprises an optical sensor that has a controllable actuator that can be controlled to point the optical sensor, and wherein controlling the unloading operation comprises:
   generating a control signal to control the controllable actuator based on the location of the receiving vehicle relative to the leading vehicle.

8. The computer implemented method of claim 1 wherein controlling the unloading operation comprises:
   generating a control signal to control a relative position of the receiving vehicle relative to the leading vehicle.

9. The computer implemented method of claim 1 wherein the leading vehicle includes a material conveyance subsystem that conveys material from the leading vehicle to the receiving vehicle during the unloading operation and wherein controlling the unloading operation comprises:
   generating a control signal to control the material conveyance subsystem based on the location of the receiving vehicle relative to the leading vehicle.

10. The computer implemented method of claim 1 wherein determining a location of the receiving vehicle relative to the leading vehicle comprises identifying boundaries of a receiving area on the receiving vehicle, and identifying buffer areas based on the boundaries of the receiving area, and wherein controlling the unloading operation comprises:
   generating a control signal to control the unloading operation based on the identified buffer areas.

11. The computer implemented method of claim 1 wherein detecting a hitch point location comprises at least one of:
   detecting a distance of the hitch point to an axle of the receiving vehicle; or
   detecting a height of the hitch point relative to ground.

12. A work machine system including a leading vehicle configured to unload material into a receiving vehicle during an unloading operation, the receiving vehicle being propelled by a following vehicle, the work machine system comprising:
   a following vehicle route detection system configured to identify a route of the following vehicle;
   a hitch point location system configured to detect a hitch point location indicative of a relative location of a hitch point relative to the leading vehicle, wherein the receiving vehicle is coupled to the following vehicle at the hitch point;
   a dynamic model configured to determine a location of the receiving vehicle relative to the leading vehicle based on the route of the following vehicle and based on the hitch point location indicative of the relative location of the hitch point relative to the leading vehicle; and
   a control system configured to control the unloading operation based on the location of the receiving vehicle relative to the leading vehicle.

13. The work machine system of claim 12 and further comprising:
   a following vehicle parameter loading system configured to obtain a following vehicle parameter indicative of an offset from a position sensor on the following vehicle to the hitch point;
   a position sensor on the leading vehicle; and
   a vehicle position detection system configured to detect a relative vehicle position indicative of a position of the position sensor on the following vehicle relative to a position of a position sensor on the leading vehicle, and wherein the hitch point location system is configured to detect the hitch point location relative to the leading vehicle based on the following vehicle parameter and the relative vehicle position.

14. The work machine system of claim 12 wherein the leading vehicle comprises:
   a material conveyance subsystem configured to convey the material from the leading vehicle to the receiving vehicle, and wherein the dynamic model is configured to determine a location of the receiving vehicle relative to a portion of the material conveyance subsystem on the leading vehicle.

15. The work machine system of claim 12 wherein the dynamic model comprises:
   a machine learned model.

16. The work machine system of claim 12 wherein the dynamic model comprises:
   a kinematic model that models kinematics corresponding to the receiving vehicle.

17. The work machine system of claim 12 wherein the leading vehicle comprises:
   an optical sensor; and
   a controllable actuator coupled to the optical sensor and controllable to point the optical sensor, and wherein the control system is configured to generate a control signal to control the controllable actuator based on the location of the receiving vehicle relative to the leading vehicle.

18. The work machine system of claim 12 wherein the control system is configured to generate a control signal to control a relative position of the receiving vehicle relative to the leading vehicle.

19. The work machine system of claim 14 wherein the control system is configured to generate a control signal to control the material conveyance subsystem based on the location of the receiving vehicle relative to the leading vehicle.

* * * * *